(12) United States Patent
Tedesco et al.

(10) Patent No.: US 7,546,277 B1
(45) Date of Patent: Jun. 9, 2009

(54) METHOD AND APPARATUS FOR DYNAMICALLY MANAGING VENDING MACHINE INVENTORY PRICES

(75) Inventors: Daniel E. Tedesco, Monroe, CT (US);
James A. Jorasch, Stamford, CT (US);
Robert R. Lech, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/947,798

(22) Filed: Oct. 9, 1997

(51) Int. Cl.
*G06F 17/00* (2006.01)

(52) U.S. Cl. .......................... 705/400; 705/10; 705/22; 705/28

(58) Field of Classification Search .................... 705/1, 705/15, 18, 22, 28, 10, 400; 99/325; 235/375, 235/378, 381, 385; 364/479.01, 479.06–479.08; 700/231, 232, 236, 238
See application file for complete search history.

(56) References Cited

U.S. PATENT DOCUMENTS

| | | | |
|---|---|---|---|
| 2,607,463 A | 8/1952 | Saigh | |
| 3,442,422 A | 5/1969 | Neidig | |
| 3,442,442 A | 5/1969 | Neidig | |
| 3,573,747 A | 4/1971 | Adams et al. | |
| 3,609,250 A | 9/1971 | Morris | |
| 3,691,527 A | 9/1972 | Yamamoto | |
| 3,705,348 A | 12/1972 | Wahlberg | |
| 3,705,384 A | 12/1972 | Wahlberg | |
| 3,718,906 A | 2/1973 | Lightner | |
| 3,747,733 A | 7/1973 | Knickerbocker | |
| 3,937,929 A | 2/1976 | Knauer | |
| 3,947,882 A | 3/1976 | Lightner | |
| 4,008,792 A | 2/1977 | Levasseur et al. | 194/217 |
| RE29,450 E | 10/1977 | Goldsby | |
| 4,108,361 A | 8/1978 | Krause | |
| 4,237,537 A | 12/1980 | Pitches et al. | 705/401 |

(Continued)

FOREIGN PATENT DOCUMENTS

CA 2070736 A1 6/1992

(Continued)

OTHER PUBLICATIONS

Burke, Raymond R. "Do You See What I See? The Future of Virtual Shopping." Journal of the Academy of Marketing Science, vol. 25, No. 4, pp. 352-360, Fall 1997.*

(Continued)

*Primary Examiner*—Susanna M Diaz

(57) ABSTRACT

The present invention is a method and apparatus for automatically managing a price of a product in a vending machine. The method and apparatus is disclosed for implementing dynamic price adjustments at various times including after stocking, after a sale of a product and at periodic intervals. The method generally includes the steps of updating inventory data, including a quantity of a product, accessing price management data associated with the product, and determining the price of the product. According to the method and apparatus of the present invention, the determined price of the product is based on the price management data and the inventory data. The determined price is then stored in a memory of the apparatus and displayed for customers. The apparatus may be a vending machine, a processing module within the vending machine, or an external module remotely transmitting the dynamically adjusted price to a vending machine.

5 Claims, 15 Drawing Sheets

| DISPENSER IDENTIFIER 510 | PRODUCT IDENTIFIER 512 | ... | STOCK DATE 520 | TERMINATION DATE 522 | TOTAL SHELF TIME 524 | REMAINING SHELF TIME 526 |
|---|---|---|---|---|---|---|
| 548→ A1 | CHIPS | ... | 6/10/97 | 7/24/97 | 44 DAYS | 23 DAYS |
| 550→ A2 | PRETZELS | ... | 6/10/97 | 7/24/97 | 44 DAYS | 23 DAYS |
| 552→ A3 | GRANOLA | ... | 6/10/97 | 8/15/97 | 66 DAYS | 45 DAYS |
| 554→ B1 | SANDWICH | ... | 6/25/97 | 7/03/97 | 8 DAYS | 2 DAYS |
| 556→ B2 | APPLE PIE | ... | 6/25/97 | 7/02/97 | 7 DAYS | 1 DAY |
| 558→ B3 | FRUIT PIE | ... | 6/25/97 | 7/03/97 | 8 DAYS | 2 DAYS |
| 560→ C1 | ORANGE DRINK | ... | 6/15/97 | 9/01/97 | 78 DAYS | 62 DAYS |
| 562→ C2 | COLA | ... | 6/23/97 | 9/01/97 | 70 DAYS | 62 DAYS |
| 564→ C3 | SPARKLING WATER | ... | 6/01/97 | 10/01/97 | 122 DAYS | 92 DAYS |
| 566→ D1 | CANDY BAR | ... | 6/10/97 | 8/15/97 | 66 DAYS | 45 DAYS |
| 568→ D2 | SPEARMINT GUM | ... | 6/01/97 | 10/15/97 | 136 DAYS | 106 DAYS |
| 570→ D3 | POUND CAKE | ... | 6/10/97 | 7/10/97 | 30 DAYS | 9 DAYS |

| EVALUATION FREQUENCY 528 | LAST EVALUATION DATE/TIME 530 | SALES SINCE LAST EVALUATION 532 | PREVIOUS DEMAND 534 | CURRENT DEMAND 536 | DEMAND INCREMENT 538 |
|---|---|---|---|---|---|
| EVERY 3 SALES | 6/24/97 03:00 | 2 | EVERY 2.2 DAYS | EVERY 1.8 DAYS | 10% |
| EVERY 2 SALES | 6/25/97 14:00 | 1 | EVERY 2.3 DAYS | EVERY 1.9 DAYS | 10% |
| EVERY 72 HOURS | 6/27/97 12:00 | 1 | EVERY 7.5 DAYS | EVERY 8.5 DAYS | 5% |
| EVERY 6 HOURS | 6/30/97 18:00 | 0 | EVERY 2.4 DAYS | EVERY 2.5 DAYS | 15% |
| EVERY 12 HOURS | 6/30/97 12:00 | 0 | EVERY 2.5 DAYS | EVERY 2.5 DAYS | 15% |
| EVERY 24 HOURS | 6/30/97 00:00 | 0 | EVERY 4.2 DAYS | EVERY 5.0 DAYS | 15% |
| EVERY 2 SALES | 6/25/97 09:00 | 0 | EVERY 4.0 DAYS | EVERY 5.0 DAYS | 15% |
| OUTSIDE TEMPERATURE >95 | 6/28/97 08:00 | 2 | EVERY 0.9 DAYS | EVERY 0.7 DAYS | 15% |
| EVERY 2 SALES | 6/19/97 05:00 | 0 | EVERY 3.6 DAYS | EVERY 3.6 DAYS | 15% |
| EVERY 72 HOURS | 6/27/97 12:00 | 1 | EVERY 2.6 DAYS | EVERY 2.1 DAYS | 5% |
| EVERY 72 HOURS | 6/27/97 12:00 | 0 | EVERY 5.9 DAYS | EVERY 6.5 DAYS | 5% |
| EVERY 24 HOURS | 6/30/97 12:00 | 0 | EVERY 8.2 DAYS | EVERY 10.0 DAYS | 15% |

500

U.S. PATENT DOCUMENTS

| | | |
|---|---|---|
| 4,245,730 A | 1/1981 | Bachmann et al. .......... 194/350 |
| 4,258,837 A | 3/1981 | Manos |
| 4,282,575 A | 8/1981 | Hoskinson et al. |
| 4,316,532 A | 2/1982 | Levasseur |
| 4,323,770 A | 4/1982 | Dieulot et al. |
| 4,341,951 A | 7/1982 | Benton |
| 4,359,147 A | 11/1982 | Levasseur .................... 194/200 |
| 4,376,479 A | 3/1983 | Sugimoto |
| 4,412,292 A | 10/1983 | Sedam et al. .......... 364/479.11 |
| 4,420,751 A | 12/1983 | Paganini |
| 4,454,670 A | 6/1984 | Bachmann et al. |
| 4,478,353 A | 10/1984 | Levasseur ..................... 221/14 |
| 4,494,197 A | 1/1985 | Troy et al. |
| 4,498,570 A | 2/1985 | King et al. .................. 194/217 |
| 4,500,880 A | 2/1985 | Gomersall et al. |
| 4,518,098 A | 5/1985 | Fleischer |
| 4,551,935 A | 11/1985 | Bachmann |
| 4,554,446 A | 11/1985 | Murphy |
| 4,567,609 A | 1/1986 | Metcalf |
| 4,574,947 A | 3/1986 | Hutchings |
| RE32,115 E | 4/1986 | Lockwood |
| 4,587,984 A | 5/1986 | Levasseur et al. |
| 4,593,361 A | 6/1986 | Otten .................... 364/479.08 |
| 4,598,378 A | 7/1986 | Giacomo |
| 4,598,810 A | 7/1986 | Shore |
| 4,603,390 A | 7/1986 | Mehdipour |
| 4,628,193 A | 12/1986 | Blum |
| 4,639,875 A | 1/1987 | Abraham |
| 4,654,513 A | 3/1987 | Hennessy |
| 4,654,800 A | 3/1987 | Hayashi et al. ........ 364/479.06 |
| 4,668,150 A | 5/1987 | Blumberg |
| 4,669,730 A | 6/1987 | Small |
| 4,677,553 A | 6/1987 | Roberts et al. |
| 4,679,150 A | 7/1987 | Hayashi et al. ........ 364/479.08 |
| 4,689,742 A | 8/1987 | Troy et al. |
| 4,723,212 A | 2/1988 | Mindrum et al. |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane et al. |
| 4,766,548 A | 8/1988 | Cedrone et al. ........ 364/479.06 |
| 4,799,156 A | 1/1989 | Shavit |
| 4,815,741 A | 3/1989 | Small |
| 4,817,166 A | 3/1989 | Gonzaalez |
| 4,817,990 A | 4/1989 | Krost |
| 4,825,045 A | 4/1989 | Humble |
| 4,833,607 A | 5/1989 | Dethloff |
| 4,834,231 A * | 5/1989 | Awane et al. ............... 194/217 |
| 4,839,507 A | 6/1989 | May |
| 4,854,590 A | 8/1989 | Jolliff et al. |
| 4,857,840 A | 8/1989 | Lanchais |
| 4,859,838 A | 8/1989 | Okiharu |
| 4,872,113 A | 10/1989 | Dinerstein |
| 4,878,248 A | 10/1989 | Shyu |
| 4,882,473 A | 11/1989 | Bergeron et al. |
| 4,882,675 A | 11/1989 | Nichtberger |
| 4,899,906 A | 2/1990 | Bella |
| 4,906,828 A | 3/1990 | Halpern |
| 4,908,761 A | 3/1990 | Tai |
| 4,910,672 A | 3/1990 | Off et al. |
| 4,915,205 A | 4/1990 | Reid |
| 4,922,435 A | 5/1990 | Cahlander |
| 4,922,522 A | 5/1990 | Scanlon |
| 4,937,853 A | 6/1990 | Brule et al. |
| 4,947,028 A | 8/1990 | Gorog |
| 4,963,723 A | 10/1990 | Masada |
| 4,973,952 A | 11/1990 | Malec et al. |
| 4,982,337 A | 1/1991 | Burr et al. |
| 4,982,346 A | 1/1991 | Giruard |
| 4,992,940 A | 2/1991 | Dworkin |
| 4,993,714 A | 2/1991 | Golightly |
| 4,999,763 A | 3/1991 | Ousborne |
| 5,010,485 A | 4/1991 | Bigari |
| 5,029,098 A | 7/1991 | Levasseur |
| 5,034,739 A | 7/1991 | Gruhl |
| 5,039,848 A | 8/1991 | Stoken |
| 5,056,019 A | 10/1991 | Schultz et al. |
| 5,058,044 A | 10/1991 | Stewart |
| 5,064,999 A | 11/1991 | Okamoto |
| 5,081,685 A | 1/1992 | Jones, III |
| 5,083,638 A | 1/1992 | Schneider |
| 5,091,713 A | 2/1992 | Horne et al. ................. 340/541 |
| 5,117,354 A | 5/1992 | Long |
| 5,117,407 A | 5/1992 | Vogel |
| 5,119,295 A | 6/1992 | Kapur |
| 5,128,861 A | 7/1992 | Kagami |
| 5,128,862 A | 7/1992 | Mueller |
| 5,132,914 A | 7/1992 | Cahlander et al. |
| 5,136,658 A | 8/1992 | Mori |
| 5,172,328 A | 12/1992 | Cahlander et al. |
| 5,173,851 A | 12/1992 | Off et al. |
| 5,176,224 A | 1/1993 | Spector |
| 5,177,342 A | 1/1993 | Adams |
| 5,185,695 A | 2/1993 | Pruchnicki |
| 5,189,607 A | 2/1993 | Shirasaki |
| 5,191,410 A | 3/1993 | McCalley |
| 5,192,854 A | 3/1993 | Counts |
| 5,193,648 A | 3/1993 | Yuter |
| 5,201,010 A | 4/1993 | Deaton et al. |
| 5,202,826 A | 4/1993 | McCarthy |
| 5,204,675 A | 4/1993 | Sekine |
| 5,216,595 A | 6/1993 | Protheroe |
| 5,223,698 A | 6/1993 | Kapur |
| 5,231,569 A | 7/1993 | Myatt et al. |
| 5,239,165 A | 8/1993 | Novak |
| 5,243,515 A | 9/1993 | Lee |
| 5,245,533 A | 9/1993 | Marshall |
| 5,250,789 A | 10/1993 | Johnsen |
| 5,253,165 A | 10/1993 | Leiseca |
| 5,257,179 A | 10/1993 | DeMar ........................ 463/25 |
| 5,262,941 A | 11/1993 | Saladin et al. |
| 5,267,452 A | 12/1993 | Zinsmeyer et al. ............ 62/505 |
| 5,269,521 A | 12/1993 | Rossides |
| 5,274,547 A | 12/1993 | Zoffel et al. |
| 5,283,731 A | 2/1994 | Lalonde et al. |
| 5,287,267 A | 2/1994 | Srinivasan |
| 5,287,268 A | 2/1994 | McCarthy |
| 5,295,064 A | 3/1994 | Malec |
| 5,297,031 A | 3/1994 | Gutterman et al. |
| 5,302,811 A | 4/1994 | Fukatsu |
| 5,309,355 A | 5/1994 | Lockwood |
| 5,315,093 A | 5/1994 | Stewart |
| 5,315,664 A | 5/1994 | Kumagai |
| 5,319,542 A | 6/1994 | King, Jr. |
| 5,325,291 A | 6/1994 | Garrett |
| 5,339,250 A | 8/1994 | Durbin .................. 364/479.07 |
| 5,345,071 A | 9/1994 | Dumont |
| 5,353,218 A | 10/1994 | De Lapa et al. |
| 5,353,219 A | 10/1994 | Mueller et al. |
| 5,361,871 A | 11/1994 | Gupta |
| 5,367,452 A | 11/1994 | Gallery et al. ................. 705/28 |
| 5,368,129 A * | 11/1994 | Von Kohorn .................. 186/52 |
| 5,371,796 A | 12/1994 | Avarne |
| 5,380,991 A | 1/1995 | Valencia et al. |
| 5,381,155 A | 1/1995 | Gerber |
| 5,383,111 A | 1/1995 | Homma |
| RE34,915 E | 4/1995 | Nichtberger et al. |
| 5,408,417 A | 4/1995 | Wilder |
| 5,415,264 A | 5/1995 | Menoud |
| 5,420,606 A | 5/1995 | Begum |
| 5,422,473 A | 6/1995 | Kamata |
| 5,425,108 A | 6/1995 | Hwang |
| 5,434,394 A | 7/1995 | Roach et al. |

| | | | | | | |
|---|---|---|---|---|---|---|
| 5,440,336 A | 8/1995 | Buhro et al. | | 5,739,512 A | 4/1998 | Tognazzini |
| 5,445,295 A | 8/1995 | Brown | | 5,748,485 A | 5/1998 | Christiansen et al. |
| 5,448,471 A | 9/1995 | Deaton | | 5,754,653 A | 5/1998 | Canfield |
| 5,450,938 A | 9/1995 | Rademacher ............... 194/206 | | 5,758,328 A | 5/1998 | Giovannoli |
| 5,452,344 A | 9/1995 | Larson ................. 340/310.01 | | 5,761,648 A | 6/1998 | Golden et al. |
| 5,459,306 A | 10/1995 | Stein et al. | | 5,768,142 A | 6/1998 | Jacobs |
| 5,467,892 A | 11/1995 | Schlamp | | 5,769,269 A | 6/1998 | Peters |
| 5,481,094 A | 1/1996 | Suda | | 5,772,510 A | 6/1998 | Roberts |
| 5,482,139 A | 1/1996 | Rivalto | | 5,774,868 A | 6/1998 | Cragun et al. |
| 5,495,412 A | 2/1996 | Thiessen | | 5,774,870 A | 6/1998 | Storey |
| 5,504,475 A | 4/1996 | Houdou et al. | | 5,774,874 A | 6/1998 | Veeneman et al. |
| 5,504,675 A | 4/1996 | Cragun et al. | | 5,780,133 A | 7/1998 | Engstrom |
| 5,510,979 A | 4/1996 | Moderi et al. | | 5,791,991 A | 8/1998 | Small |
| 5,511,646 A | 4/1996 | Maldanis et al. | | 5,794,207 A | 8/1998 | Walker et al. |
| 5,513,117 A | 4/1996 | Small | | 5,799,284 A | 8/1998 | Bourquin |
| 5,521,364 A | 5/1996 | Kimura | | 5,802,015 A | 9/1998 | Rothschild et al. ............ 368/10 |
| 5,526,257 A | 6/1996 | Lerner | | 5,806,044 A | 9/1998 | Powell |
| 5,536,045 A | 7/1996 | Adams | | 5,809,144 A | 9/1998 | Sirbu et al. |
| 5,537,314 A | 7/1996 | Kanter | | 5,816,918 A | 10/1998 | Kelly et al. |
| 5,544,040 A | 8/1996 | Gerbaulet | | 5,819,285 A | 10/1998 | Damico et al. |
| 5,544,784 A | 8/1996 | Malaspina | | 5,822,216 A | 10/1998 | Satchell, Jr. et al. |
| 5,546,316 A | 8/1996 | Buckley | | 5,822,736 A * | 10/1998 | Hartman et al. ................ 705/1 |
| 5,550,746 A | 8/1996 | Jacobs | | 5,831,862 A | 11/1998 | Hetrick et al. |
| 5,557,721 A | 9/1996 | Fite | | 5,832,457 A | 11/1998 | O'Brien |
| 5,568,406 A | 10/1996 | Gerber | | 5,835,896 A * | 11/1998 | Fisher et al. ................... 705/37 |
| 5,572,653 A | 11/1996 | DeTemple et al. | | 5,842,212 A | 11/1998 | Ballurio et al. |
| 5,581,064 A | 12/1996 | Riley et al. | | 5,844,808 A | 12/1998 | Konsmo et al. |
| 5,591,972 A | 1/1997 | Noble | | 5,845,265 A | 12/1998 | Woolston |
| 5,592,375 A | 1/1997 | Salmon et al. | | 5,848,399 A | 12/1998 | Burke |
| 5,592,376 A | 1/1997 | Hodroff et al. | | 5,850,446 A | 12/1998 | Berger et al. |
| 5,592,378 A | 1/1997 | Cameron et al. | | 5,855,007 A | 12/1998 | Jovicic et al. |
| 5,596,501 A | 1/1997 | Comer | | 5,857,175 A | 1/1999 | Day et al. |
| 5,602,377 A | 2/1997 | Beller et al. | | 5,860,362 A | 1/1999 | Smith |
| 5,604,901 A | 2/1997 | Kelley | | 5,864,604 A | 1/1999 | Moen et al. |
| 5,608,643 A | 3/1997 | Wichter et al. | | 5,864,822 A | 1/1999 | Baker, III |
| 5,611,051 A | 3/1997 | Pirelli | | 5,870,716 A | 2/1999 | Sugiyama et al. |
| 5,611,052 A | 3/1997 | Dykstra et al. | | 5,870,717 A | 2/1999 | Wiecha |
| 5,612,527 A | 3/1997 | Ovadia | | 5,870,719 A | 2/1999 | Maritzen et al. |
| 5,612,868 A | 3/1997 | Off et al. | | 5,873,069 A * | 2/1999 | Reuhl et al. ................... 705/20 |
| 5,613,620 A | 3/1997 | Center et al. ................ 221/133 | | 5,875,110 A | 2/1999 | Jacobs |
| 5,615,269 A | 3/1997 | Micali | | 5,878,139 A | 3/1999 | Rosen |
| 5,620,079 A | 4/1997 | Molbak | | 5,878,401 A | 3/1999 | Joseph |
| 5,621,201 A | 4/1997 | Langhans et al. | | 5,883,810 A | 3/1999 | Franklin et al. |
| 5,621,640 A | 4/1997 | Burke | | 5,887,271 A | 3/1999 | Powell |
| 5,630,357 A | 5/1997 | Akiyama | | 5,890,136 A | 3/1999 | Kipp |
| 5,631,724 A | 5/1997 | Sawada | | 5,905,246 A | 5/1999 | Fajkowski |
| 5,632,010 A | 5/1997 | Briechle et al. | | 5,907,830 A | 5/1999 | Engel et al. |
| 5,633,839 A | 5/1997 | Alexander et al. | | 5,918,213 A | 6/1999 | Bernard et al. |
| 5,637,859 A | 6/1997 | Menoud | | 5,924,080 A | 7/1999 | Johnson |
| 5,638,302 A | 6/1997 | Gerber | | 5,924,082 A | 7/1999 | Silverman et al. |
| 5,651,075 A | 7/1997 | Frazier | | 5,930,145 A | 7/1999 | Yuyama et al. |
| 5,666,493 A | 9/1997 | Wojcik | | 5,930,771 A | 7/1999 | Stapp |
| 5,675,662 A | 10/1997 | Deaton | | 5,937,391 A | 8/1999 | Ikeda et al. |
| 5,685,435 A | 11/1997 | Picioccio et al. | | 5,938,717 A | 8/1999 | Dunne et al. |
| 5,687,087 A | 11/1997 | Taggart | | 5,947,328 A | 9/1999 | Kovens et al. |
| 5,687,322 A | 11/1997 | Deaton et al. | | 5,948,038 A | 9/1999 | Daly et al. |
| 5,692,132 A | 11/1997 | Hogan | | 5,949,688 A | 9/1999 | Montoya et al. |
| 5,701,252 A | 12/1997 | Facchin et al. .............. 235/381 | | 5,959,869 A | 9/1999 | Miller et al. |
| 5,708,782 A | 1/1998 | Larson | | 5,959,945 A | 9/1999 | Kleinman |
| 5,710,557 A | 1/1998 | Schuette | | 5,963,452 A | 10/1999 | Etoh et al. |
| 5,710,886 A | 1/1998 | Christiansen et al. | | 5,963,939 A | 10/1999 | McCann et al. |
| 5,710,887 A | 1/1998 | Chelliah et al. | | 5,964,660 A * | 10/1999 | James et al. .................... 463/1 |
| 5,713,795 A | 2/1998 | Kohorn | | 5,970,469 A | 10/1999 | Scroggie et al. |
| 5,717,866 A | 2/1998 | Naftzger | | 5,974,399 A | 10/1999 | Giuliani et al. |
| 5,719,396 A | 2/1998 | Jack et al. | | 5,991,740 A | 11/1999 | Messer |
| 5,726,450 A | 3/1998 | Peterson et al. | | 5,995,942 A | 11/1999 | Smith et al. |
| 5,727,163 A | 3/1998 | Bezos | | 5,997,236 A | 12/1999 | Picioccio et al. |
| 5,727,164 A | 3/1998 | Kaye et al. | | 5,997,928 A * | 12/1999 | Kaish et al. ................. 426/418 |
| 5,732,398 A | 3/1998 | Tagawa | | 5,999,914 A | 12/1999 | Blinn et al. |
| 5,732,950 A | 3/1998 | Moody | | 6,012,834 A * | 1/2000 | Dueck et al. ................ 700/238 |
| 5,734,150 A * | 3/1998 | Brown et al. ................ 235/381 | | 6,012,890 A | 1/2000 | Garrido |
| 5,734,838 A | 3/1998 | Robinson et al. | | 6,014,634 A | 1/2000 | Scroggie et al. |
| 5,737,710 A | 4/1998 | Anythonyson | | 6,016,504 A | 1/2000 | Arnold et al. |

| | | | |
|---|---|---|---|
| 6,017,157 A | 1/2000 | Garfinkle | |
| 6,021,394 A | 2/2000 | Takahashi | 705/10 |
| 6,026,370 A | 2/2000 | Jermyn | |
| 6,029,141 A | 2/2000 | Bezos et al. | |
| 6,035,284 A | 3/2000 | Straub et al. | |
| 6,038,551 A | 3/2000 | Barlow et al. | |
| 6,049,777 A | 4/2000 | Sheena et al. | |
| 6,056,194 A | 5/2000 | Kolls | |
| 6,119,099 A | 9/2000 | Walker et al. | |
| 6,131,085 A | 10/2000 | Rossides | |
| 6,134,534 A | 10/2000 | Walker et al. | |
| 6,193,154 B1 | 2/2001 | Phillips et al. | |
| 6,205,435 B1 | 3/2001 | Biffar | |
| 6,223,163 B1 | 4/2001 | Van Luchene | |
| 6,243,691 B1 * | 6/2001 | Fisher et al. | 705/37 |
| 6,249,772 B1 | 6/2001 | Walker | |
| 6,324,520 B1 | 11/2001 | Walker et al. | 705/16 |
| 6,370,513 B1 | 4/2002 | Kolawa et al. | |
| 6,405,174 B1 | 6/2002 | Walker et al. | |
| 6,587,031 B1 | 7/2003 | Daugherty | |
| 2003/0139969 A1 | 7/2003 | Scroggie et al. | |

FOREIGN PATENT DOCUMENTS

| | | | |
|---|---|---|---|
| CA | 2217739 | | 4/1996 |
| DE | 4037689 | | 6/1992 |
| EP | 0 085 546 | A2 | 8/1983 |
| EP | 0323383 | | 7/1989 |
| EP | 512413 | A | 11/1992 |
| EP | 0512509 | A2 | 11/1992 |
| EP | 0526118 | | 2/1993 |
| EP | 0619662 | A | 10/1994 |
| EP | 0697793 | A | 2/1996 |
| EP | 0779587 | A2 | 9/1996 |
| EP | 0744856 | A | 11/1996 |
| EP | 0 817 138 | A1 | 1/1998 |
| GB | 2109305 | A | 6/1983 |
| GB | 2265032 | A | 9/1993 |
| GB | 2 317 257 | A | 3/1998 |
| JP | 58-132886 | | 8/1983 |
| JP | 2001093 | A | 1/1990 |
| JP | 2208798 | A | 8/1990 |
| JP | 4235700 | A | 8/1992 |
| JP | 5242363 | A | 9/1993 |
| JP | 6035946 | | 2/1994 |
| JP | 7065218 | A | 3/1995 |
| JP | 7078274 | | 3/1995 |
| JP | 07098779 | A | 4/1995 |
| JP | 95139380 | | 6/1995 |
| JP | 95162556 | | 6/1995 |
| JP | 07249176 | | 9/1995 |
| JP | 7272012 | | 10/1995 |
| JP | 8030848 | A | 2/1996 |
| JP | 08137951 | | 5/1996 |
| JP | 8-147545 | * | 6/1996 |
| JP | 8221484 | | 8/1996 |
| JP | 8221645 | A | 8/1996 |
| JP | 0779587 | A3 | 9/1996 |
| JP | 8329323 | A | 12/1996 |
| JP | 9016836 | A | 1/1997 |
| JP | 9062908 | A | 3/1997 |
| JP | 9097288 | | 4/1997 |
| JP | 9190478 | A | 7/1997 |
| JP | 9190479 | | 7/1997 |
| JP | H9 198554 | | 7/1997 |
| JP | 10187820 | | 7/1998 |
| JP | 10214284 | | 8/1998 |
| JP | 10240830 | | 9/1998 |
| JP | 10269049 | | 10/1998 |
| JP | 10289372 | A | 10/1998 |
| JP | 11088560 | | 3/1999 |
| KR | 9503826 | | 4/1995 |
| WO | WO 98/48388 | | 10/1988 |
| WO | WO 90/16033 | A | 12/1990 |
| WO | WO 94/09440 | | 4/1994 |
| WO | WO 95/27242 | | 10/1995 |
| WO | WO 96/32701 | | 10/1996 |
| WO | WO 97/08638 | A1 | 3/1997 |
| WO | WO 97/16797 | | 5/1997 |
| WO | WO 97/16897 | | 5/1997 |
| WO | WO 97/20279 | | 6/1997 |
| WO | WO 97/21200 | | 6/1997 |
| WO | WO 97/23838 | | 7/1997 |
| WO | WO97/24701 | * | 7/1997 |
| WO | WO 97/25684 | | 7/1997 |
| WO | WO 97/28510 | | 8/1997 |
| WO | WO 97/44749 | | 11/1997 |
| WO | WO 97/50064 | | 12/1997 |
| WO | WO 98/06050 | | 2/1998 |
| WO | WO 98/15907 | | 4/1998 |
| WO | WO 98/28699 | | 7/1998 |

OTHER PUBLICATIONS

David Hirschfield, "Increasing Profits Through Automation", Independent Vendors Association Quarterly, Apr. 1997.

Vendmaster—Windows for Vending Reports (http://www.vendmaster.com/reports_main.html) Download date: Feb. 6, 1998.

Allan Z. Gilbert, "A Call to Action for Wireless Data Communication", Automatic Merchandiser, Aug. 1996 at p. 62.

Elliot Maras, "Software Opens Doors to Scientific Machine Menuing", Automatic Merchandiser, Feb. 1996 at p. 36.

Atsushi Nakayama, "Coca-Cola Machines to be 'Smarter'", The Japan Economic Journal, Feb. 23, 1991, Industry: Chemicals at p. 22.

PCT International Search Report for Application No. PCT/US98/21216, dated May 4, 1999.

Brochure, "Introducing the Digital MenuBoard", Siren Technologies, Inc., (www.sirentech com).

Rehayem, Gilbert, "Opinion: X-Press Betting", Information Systems & Technology, Ontario Lottery Corp.

Samuelson, Paul, Economics, McGraw-Hill Book Company, 8th Edition, Copyright 1948, pp. 446, 532.

"Cape Town", Reuters Ltd, Nov. 8, 1979, PM Cycle.

"Save the mark", Financial Times (London), Feb. 1, 1983, Section I, Men & Matters at p. 12.

Cook, Louise, "ConsumerWatch: Clip, Snip, Save", The Associated Press, Mar. 12, 1984, Business News Section.

"POS spectrum: a lottery looks to POS for growth", UMI, Inc., POS News, Jan. 1989, vol. 5, No. 7, p. 8, ISSN: 0896-6230, CODEN: BHORAD.

Kuttner, Robert, "Computers May Turn The World Into One Big Commodities Pit", Business Week, Sep. 11, 1989, Section: Economic Viewpoint, No. 3123 at p. 17.

Schrage, Michael, "An Experiment In Economic Theory; Labs Testing Real Markets", The Record, Nov. 26, 1989, Section: Business at p. B01.

"Let's Play the Cash Register Receipts Lottery", The New York Times, Dec. 25, 1990, Section 1, p. 30, col. 4, Editorial Desk.

Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc." Health Industry Today, Jun. 1991, Section: vol. 54, No. 6, p. 4, ISSN: 0745-4678.

Pelline, Jeff, "Travelers Bidding On Airline Tickets SF firm offers chance for cut-rate fares" The San Francisco Chronicle, Aug. 19, 1991, Sections: News at p. A4.

Henry, Anne, "High-tech vending: vending machine OEMs begin to resemble their consumer electronics counter parts when it comes to rapid-fire implementation of technology; orginal equipment manufacturers", Appliance, Dec. 1991, Section: vol. 48, No. 12, p. 39, ISSN: 0003-6781.

Del Rosso, Laura, "Ticket-bidding firm closes its doors; Marketel International; Brief Article", Travel Weeky, Mar. 12, 1992, Section: vol. 51, No. 21, p. 1, ISSN: 0041-2082.

Fink, Ronald, "Data processing: PepsiCo.", Finance World, Sep. 29, 1992, vol. 161, No. 19, p. 52(1), ISSN: 0015-2064.

"Coupons get serious; supermarkets use barcodes to prevent misredemptions", Chain Store Age Executive with Shopping Center Age, Oct. 1992, Section: vol. 68, No. 10, p. 68, ISSN: 0193-1199.

Gilbert, Allan Z., "Operators can gain with creative merchandising", Automatic Merchandiser, Oct. 1992, p. 80, ISSN: 1061-1797.

Website: "FAQ: CSH Coke Machine Information", Institute of Information & Computing Sciences (ICS), May 23, 1994, vol. 1.2, (http //www cs uu nl/wais/html/na-dir/csh-coke-machine-info html).

Jones, Jeanne, "Data Readers Streamline Management; Scanner Technology Aids Retailers As Well As Plants, Wholesalers", The Houston Post, Jun. 26, 1994, Section: Business at p. D1.

Fiorini, Phillip, "'No Place For Penny?'/Smallest coin doesn't make cents to some", USA Today, Jul. 29, 1994, Section: News at p. 1A.

Smith, Alison, "Survey of UK Consumer Credit and Asset Finance", Financial Times, Nov. 3, 1994, Section: p. VI.

Andreoli, Tom et al., "Cash Machines Offer A Whole Lotto Money for Withdrawl; An Unfortunate Juxtaposition; Block That Metaphor!; Something Street Talk; Fishy in Springfiled; State Street Sears?; Champion As Underdog; A 'Whole Language' Graduate", Crain's Chicago Business, Jun. 19, 1995, Section: News at p. 8.

"Spain: BBV launches new card", Cards International, Jun. 22, 1995 at p. 5.

Greene, Jan, "Farm bills please assns; National Grocers Association", Supermarket News, vol. 35, Dec. 23, 1985 at p. 6.

Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Maras, Elliot, "Software opens doors to scientific machine menuing", Automatic Merchandiser, Feb. 1996, P. 36, ISSN: 0002-7545.

Hadley, Kimberly, "Pastors praying anti-arson will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

"Public Internet Kiosks, Inc. Receives First Order For Its 'Internet Station'—The Vending Machine of the Future", PR Newswire, Sep. 16, 1996.

Singletary, Michelle, "Electronic World, Unchecked Problem?U.S. Move to Paperless Payments Raises Worries About Those Who Don't Use Banks", The Washington Post, Mar. 4, 1997, Section: Financial at p. C01.

"VendMaster: Windows and Vending Software, News", Independent Vendors Association Quarterly, (http //www vendmaster com/news_main html), Apr./May/Jun. 1997.

French, Simone A., "A Pricing Strategy to Promote Low-Fat Snack Choices through Vending Machines", American Journal of Public Health, May 1997, vol. 87, No. 5, pp. 849-851.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Riordan, Teresa, "Patents; A novel approach to making a better spermicide harks back to some old-fashioned methods", The New York Times, Jun. 9, 1997, Section D, p. 2, col. 1, Business/Financial Desk.

Nairn, Geoff, "The key to your identity: Falling costs will allow fingerprint verification to be widely used, reports Geoff Nairn", Financial Times (London), Jul. 15, 1997, Section: Technology; at p. 12.

"The United Computer Exchange, How It All Works", (http //www uce com/howitworks html), download date: Jul. 23, 1997.

"Classified 2000: The Internet Classifieds", Classifieds2000, Inc., (http //www classifieds2000 com/cgi-cls/Display exe?C2K+aboutus), download date: Aug. 6, 1997.

"General trading information and terms provided by tradingfloor.com", (http //www tradingfloor com/info htm), download date: Aug. 14, 1997.

"NASDAQ", Information Sheet, (http //home axford com/corfin/corf11 htm), download date: Aug. 15, 1997.

"VendMaster: Windows and Vending Software, Reports", (http //www vendmaster com/reports_main html), download date: Feb. 6, 1998.

Website: "Vending Mi$er", (http //www optimumenergy com/products/miser html), download date: Aug. 12, 1998.

U.S. Appl. No. 08/947,798, filed Oct. 9, 1997, Tedesco.

Office Action for U.S. Appl. No. 09/345,092 dated Jan. 24, 2002, 37pp.

Office Action for U.S. Appl. No. 09/345,092 dated Mar. 20, 2001, 33pp.

Office Action for U.S. Appl. No. 09/345,092 dated Oct. 22, 2002, 42pp.

Office Action for U.S. Appl. No. 09/345,092 dated Jul. 1, 2005, 17pp.

Office Action for U.S. Appl. No. 09/345,092 dated Mar. 10, 2006, 8pp.

Office Action for U.S. Appl. No. 09/345,092 dated Aug. 29, 2006, 12pp.

Notice of Allowability for U.S. Appl. No. 09/345,092 dated Oct. 24, 2006, 4pp.

Notice of Allowability for U.S. Appl. No. 09/345,092 dated Mar. 19, 2007, 4pp.

Office Action for U.S. Appl. No. 09/345,092 dated Jun. 15, 2007, 2pp.

Office Action for U.S. Appl. No. 09/218,085 dated Nov. 17, 2000, 22pp.

Office Action for U.S. Appl. No. 09/218,085 dated May 23, 2007, 9pp.

Office Action for U.S. Appl. No. 09/218,085 dated Aug. 31, 2007, 2pp.

Office Action for U.S. Appl. No. 09/218,085 dated Nov. 24, 2006, 6pp.

Office Action for U.S. Appl. No. 09/218,085 dated Aug. 18, 2006, 4pp.

Office Action for U.S. Appl. No. 09/218,085 dated Mar. 9, 2006, 6pp.

Office Action for U.S. Appl. No. 09/218,085 dated Nov. 1, 2002, 24pp.

Office Action for U.S. Appl. No. 09/218,085 dated Oct. 19, 2004, 23pp.

Office Action for U.S. Appl. No. 09/218,085 dated Aug. 10, 2005, 5pp.

Office Action for U.S. Appl. No. 09/218,085 dated Jul. 27, 2001, 23pp.

Office Action for U.S. Appl. No. 10/095,372 dated Aug. 26, 2005, 12pp.

Office Action for U.S. Appl. No. 10/095,372 dated Mar. 4, 2005, 8pp.

Office Action for U.S. Appl. No. 09/218,085 dated Apr. 3, 2008, 6pp.

Office Action for U.S. Appl. No. 09/218,085 dated Dec. 11, 2007, 4pp.

Notice of Allowance for U.S. Appl. No. 10/095,372 dated Jul. 6, 2006, 17pp.

Notice of Allowance for U.S. Appl. No. 10/095,372 dated Feb. 12, 2007, 18pp.

Interview Summary for U.S. Appl. No. 09/345,092 dated Oct. 24, 2006, 6pp.

Interview Summary for U.S. Appl. No. 09/345,092 dated Mar. 9, 2007, 6pp.

Office Action for U.S. Appl. No. 09/348,566, dated Oct. 1, 2003, pp. 3-5, 3pp.

International Search Report for PCT/US99/22650, Dated Mar. 16, 2000, 10pp.

International Seach Report for PCT/US99/21720, Dated Mar. 23, 2000, 7pp.

International Search Report for PCT/US97/13588, dated Dec. 4, 1997, 3pp.

International Search Report for PCT/US00/13349, dated Nov. 9, 2000, 3pp.

International Search Report for PCT/NO95/00060, dated Oct. 10, 1995, 3pp.
International Search Report for Application No. PCT/US98/21216, dated May 4, 1999, 4pp.
Office Action dated Mar. 20, 2001, U.S. Appl. No. 09/345,092, 33 pages.
Office Action dated Oct. 22, 2002, U.S. Appl. No. 09/345,092, 38 pages.
Office Action dated Jul. 1, 2005, U.S. Appl. No. 09/345,092, 17 pages.
Office Action dated Mar. 10, 2006, U.S. Appl. No. 09/345,092, 8 pages.
Office Action dated Aug. 29, 2006 U.S. Appl. No. 09/345,092, 12 pages.
Notice of Allowance dated Oct. 24, 2006, U.S. Appl. No. 09/345,092, 7 pgs.
Notice of Allowance dated Mar. 9, 2007, U.S. Appl. No. 09/345,092, 7 pgs.
International Preliminary Examination Report for Application No. PCT/US00/13349 dated Jul. 20, 2001, 6pp.
International Preliminary Examination Report for Application No. PCT/US00/13349 dated Aug. 30, 2001.
International Preliminary Examination Report for Application No. PCT/US98/21216 dated Sep. 24, 1999, 4pp.
Office Action for U.S. Appl. No. 11/456,355 dated Feb. 21, 2008, 16pp.
Office Action for U.S. Appl. No. 11/456,355 dated Oct. 3, 2007, 4pp.
Office Action for U.S. Appl. No.09/012,163 dated Jul. 6, 2000, 22pp.
Office Action for U.S. Appl. No.09/012,163 dated Jan. 10, 2001, 13pp.
Office Action for U.S. Appl. No.09/012,163 dated Sep. 29, 1999, 20pp.
Office Action for U.S. Appl. No.09/012,163 dated Feb. 29, 2000, 7pp.
Notice of Allowability for U.S. Appl. No. 09/012,163 dated Jul. 19, 2001, 4pp.
Notice of Allowability for U.S. Appl. No. 09/012,163 dated Nov. 27, 2001, 4pp.
International Search Report for Application No. PCT/US99/01089 dated May 11, 1999, 1pp.
Office Action for U.S. Appl. No. 09/164,670 dated May 11, 2000, 10pp.
Office Action for U.S. Appl. No. 09/164,670 dated Jan. 4, 2001, 8pp.
Notice of Allowance for U.S. Appl. No. 09/164,670 dated Jul. 16, 2001, 4pp.
International Search Report for PCT/US96/13718 dated Nov. 7, 1996, 3pp.
European Search Report for EP 97/122695 dated Nov. 10, 1998, 3pp.
International Search Report for PCT/US98/17340 dated Dec. 17, 1998, 1pp.
International Search Report for EP 97/122899 dated Aug. 9, 1999, 2pp.
Written Opinion for Application No. PCT/US99/01089 dated Feb. 1, 2000, 4pp.
Preliminary Exam Report for Application No. PCT/US99/01089 dated Jan. 22, 2000, 4pp.
Office Action for U.S. Appl. No. 09/348,566 dated Oct. 1, 2003, pp. 3-5.
Office Action for U.S. Appl. No. 11/456,342 dated Sep. 14, 2007, 6pp.
Office Action for U.S. Appl. No. 11/426,328 dated May 3, 2007, 6pp.
Office Action for U.S. Appl. No. 11/426,328 dated Jan. 26, 2007, 5pp.
Office Action for U.S. Appl. No. 11/426,328 dated Oct. 6, 2006, 4pp.
Office Action for U.S. Appl. No. 11/426,332 dated Aug. 25, 2006, 5pp.
Notice of Allowability for U.S. Appl. No. 11/426,332 dated Nov. 6, 2007, 1pg.
Office Action for U.S. Appl. No. 11/426,332 dated Jan. 12, 2007, 5pp.
Office Action for U.S. Appl. No. 11/426,336 dated Oct. 6, 2006, 5pp.
Office Action for U.S. Appl. No. 11/426,336 dated Jan. 26, 2007, 5pp.
Office Action for U.S. Appl. No. 11/426,336 dated May 3, 2007, 5pp.
Office Action for U.S. Appl. No. 09/713,001 dated Aug. 8, 2002, 19pp.
Office Action for U.S. Appl. No. 09/713,001 dated Mar. 24, 2003, 2pp.
Office Action for U.S. Appl. No. 09/713,001 dated Dec. 10, 2003, 6pp.
Office Action for U.S. Appl. No. 09/713,001 dated Jul. 12, 2004, 8pp.
Office Action for U.S. Appl. No. 11/426,204 dated May 4, 2007, 4pp.
Office Action for U.S. Appl. No. 11/426,204 dated Oct. 1, 2007, 5pp.
Office Action for U.S. Appl. No. 11/426,204 dated Feb. 4, 2008, 4pp.
Office Action for U.S. Appl. No. 11/426,215, dated May 4, 2007, 4pp.
Office Action for U.S. Appl. No. 11/426,221, dated May 4, 2007, 4 pp.
Kohda, Youji, Endo, Susumu, "Ubiquitous Advertising on the WWW: Merging Advertisement on the Browser", Computer Networks and SDN Systems 28, May 1, 1996 at pp. 1493-1499, 7pp.
Brochure: "Combo 3/6 Snack Food/Cold Drink Combination Vendor", U-Select-It, a Wittern Group Company, (www.uselectit.com), undated, 2pp.
Brochure: "Multi-max Distributed Vending System", Fortune Resources, Inc., (www.multi-max.com), undated, 2pp.
Tim Davis, "Vending suppliers scurry to meet Coke-mandated vendor communication", Automatic Merchandiser, Aug. 1996, pp. 62-64, 2pp.
Gelernter, David, "The Cyber-Road Not Taken; Lost on the Info-Highway? Here's Some Stuff that Could Really Change Your Life", The Washington Post, Apr. 3, 1994, Section: Outlook, p. C1, 5pp.
Choate, Robert, "Why technology brings a great future for vending", Automatic Merchandiser, Oct. 1, 1997, Section: No. 10, vol. 39, p. 16, 1061-1797, 2pp.
"The Leader in Internet Shopping Systems for Supermarkets and Drug Stores", groceries online. copyright 1996 Groceries Online, Inc. (http://www.groceries-online.com/), Copyright 1996, 4pp.
"Brother Industries is pushing ahead with its new PC software . . . ", IDC Japan Report, Aug. 30, 1991, Section: vol. 17, p. 53, 1pg.
Maras, Elliot, "1995: downsizing adds costs; new strategies sought", Automatic Merchandiser, Aug. 1996, pp. 20-22, 24, 26, 28, 30, 32, 34, 36, 38, 40 and 44, 13pp.
Naik, Gautam, "In Digital Dorm, Click on Return for Soda", The Wall Street Journal, Jan. 23, 1997, Section: Online, p. B1, 3pp.
Shea, Barbara, "Read Fine Print When Comparing Car Rentals", Feb. 9, 1997, St. Louis Post-Dispatch, Section: Travel & Leisure, p. 04T, 2pp.
Stigler, George J., "The Theory of Price", The Macmillan Company, Copyright 1952, pp. 82-94, 214-221, 14pp.
Bowman, Jr., Ward S., "Tying Arrangements and the Leverage Problem", The Yale Law Journal, Nov. 1957, vol. 67, No. 1, pp. 19-36 (10 pp.).
Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2pp.
"First Virtual Holdings Releases Beta Software for Secure Transactions on Microsoft Merchant Server", PR Newswire, Mar. 31, 1997; Section: Financial News, 2pp.
"Six vendors sign on for early electronic commerce venture", Phillips Business Information, Inc. Voice Technology News, Dec. 13, 1994; No. 25, vol. 6, ISSN: 1045-1498, 2pp.
"The easy, pain-free way to buy or lease your next car", What is autoseek; (http://www.autoseek.com/#what) download date: May 28, 1997, 4pp.
Godwin, Nadine, "New software was key lure in $17 million agency buyout.", Travel Weekly, Nov. 26, 1984, Section: vol. 43, p. 45, ISSN: 0041-2082, 4pp.
"Woodside Management Systems Inc. today announced . . . ", PR Newswire, Apr. 1, 1986, 2pp.
Tellis, Gerard J., "Beyond the Many Faces of Price: An Integration of Pricing Strategies", Journal of Marketing, Oct. 1986, vol. 50, pp. 146-160, 15pp.
Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 4pp.

Godwin, Nadine, "Agency dares to launch its own air res system; Travelmation system provides greater versatility, Automation Report", Travel Weekly, Oct. 23, 1986, 5pp.

"Thomas Cook Travel U.S.A. has announced . . . ", PR Newswire, Jan. 12, 1987, 2pp.

Bawa, Kapil et al., "The Coupon-Prone Consumer: some Findings Based on Purchase Behavior Across Product Classes", Journal of Marketing, Oct. 1987, vol. 51, pp. 99-110, 12pp.

Nomani Sr., A., "Air Crashes Stir Signs of Anxiety in Travelers", Wall Street Journal, Aug. 1, 1989, Section 2, p. 1, col. 1, 2pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.

Golden, Fran, "AAL's Riga doubts Marketel's appeal to retailers", Travel Weekly, Nov. 13, 1989, Section: vol. 48, No. 91, p. 4, ISSN: 0041-2082, 2pp.

"Letters to BusinessExtra", The San Francisco Chronicle, Dec. 26, 1989, Section: Business, C7, 3pp.

Wallace, David, "Company Planning to Let Flyers bid on Airfares", Philadelphia Business Journal, Mar. 26, 1990, Section: vol. 9, No. 3, Section 1, p. 15, 3pp.

Greenberg, Peter S., "The Savvy Traveler: Lower Air Fares For Consumers Not in the Cards . . . " Los Angeles Times, Jul. 8, 1990, Section: Travel, Part L, p. 2, col. 1, Travel Peak, 2pp.

Carey, Christopher, "Firm Offers Auction for Airline Tickets", St. Louis Post-Dispatch, Aug. 7, 1991, Section: Business, p. 1B, 2pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2pp.

"Buy Low, Fly High", USA Today, Nov. 14, 1991, Section: Bonus, p. 15, 2pp.

Feldman, Joan, M., "To rein in those CRSs; computer reservation systems" Air Transport World, Dec. 1991, Section: vol. 28, No. 12, p. 89, ISSN: 0002-2543, 5pp.

"Traveler's Notes; Bookit Report", Consumers Reports Travel Letter, Dec. 1991, Section: vol. 7, No. 12, p. 143, 1pg.

"CRTL's Blue Ribbon Deals for 1992", Consumer Reports Travel Letter, Jan. 1992, Section: vol. 8, No. 1, pp. 3-5, 2pp.

"Newsletters", The Atlanta Journal and Constitution, Mar. 1, 1992, Section: Travel: Section K, p. 13, 1pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2pp.

Hainer, Cathy et al., "Where vacationing kids get good care", USA Today, Apr. 1, 1992, Section: Life, pg. 4D, 2pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.

Rajendran, K.N. and Tellis, Gerard J., "Contextual and Temporal Components of Reference Price", Journal of Marketing, Jan. 1994, pp. 22-34 (13pp.).

Feldman, Joan M., "Reclaiming control; new software to close gap between projected and actual revenues", Aug. 1995, Section: vol. 32, No. 8, p. 35, ISSN: 0002-2543, 5pp.

*United Sates* v. *Eastman Kodak Co.*, United States Court of Appeals for the Second Circuit, decided Aug. 4, 1995, 16pp.

Bronnenberg, Bart J., "Limited Choice Sets, Local Price Response, and Implied Measures of Price Competition", Journal of Marketing Research, Spring 1996, Section: vol. XXXIII, p. 163, 20pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3pp.

"Auctioning unsold airline tickets", Insight, (USA), download date: Oct. 29, 1996, 1pg.

"Web Ventures presents Bookit!", (http www webventures com/bookit), Copyright 1996, 1pg.

"Salomon Brother's Maldutis Says Internet is Aviation's 'Third Revolution;' Will Earn Billions", World Airline News, Mar. 21, 1997, Section: vol. 7, No. 12, 2pp.

Varian, Hal R., "First Monday: Differential Pricing and Efficiency", (http www firstmonday dk/issues/issue2/different/), Copyright 1996, 18pp.

"Bookit Airfare Bidding System (Fax for Your Plane Ticket?)", Consumer Reports Travel Letter, Sept. 1991, Section: vol. 7, No. 9, pp. 97, 106, 3pp.

Nelson, Janet, "Practical Traveler; Airlines Relaxing Policy On No-Refund Tickets", The New York Times, Sep. 22, 1991, Section 5, p. 3, col. 1, Travel Desk, 4pp.

"Traveler's Notes: Easier Airfare Bidding.", Consumer Reports Travel Letter, Oct. 1991, Section: vol. 7, No. 10, p. 119, 1pg.

Burke, Raymond R., "Virtual Shopping: Breakthrough in Marketing Research", Harvard Business Review, Mar.-Apr. 1996, pp. 120-131, 9pp.

Anthony Joseph, "Baby the engine, and other saving tips", The Christian Science Monitor, Nov. 4, 1986, p. B10, 3p.

"Coupons & more", welcome to coolsavings.com—Copyright 1996-1999.(http://208,134.230.42/cgi-win/tempprs.exe/first.htm), 3pp.

"New Wave Marketing", Promotion Times, An SCA Quarterly Newsletter—First Quarter, undated, 2pp.

"Global, Second-Generation, and Frequent-Buyer Set New Trends", Marketing News, Jun. 7, 1985, vol. 19, No. 12, p. 18, ISSN: 0025-3790, 1pg.

Lacher, Lisa, "Coupon Gimmick Registers Profits", Business Dateline, Business Record, Dec. 7, 1987, vol. 83, No. 47, Section 1, 2pp.

Stevens, Lawrence, "Hypermarket Challenge", Computerworld, Dec. 19, 1988, Section: Software & Services, 2pp.

McIntyre, Faye, "Small businesses may prefer alternatives to advertising.", South Dakota Business Review, Jun. 1989, vol. 47, No. 4, p. 1(4), ISSN: 0038-3260, 4pp.

"Safeway Introduces Store-Generated Coupons", PR Newswire, May 1, 1990, 1pg.

Ramirez, Anthony, "The Pizza Version of Dialing '911'", The New York Times, Sep. 9, 1991, Late Edition—Final, Section D, p. 1, col. 3, Financial Desk, 4 pp.

Blattenberg, Robert C., "Interactive marketing: exploiting the age of addressability.", Sloan Management Review, Sep. 22, 1991, Section: vol. 33, No. 1, p. 5, ISSN: 0019-848X, 15pp.

O'Kane, Gerry, "Parking your car by computer", South China Morning Post, Mar. 23, 1993, Section: Supplement at p. 3, 3pp.

McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5pp.

Arend, Mark, "Debit frenzy? Not quite, but getting there", ABA Banking Journal, Apr. 1994, vol. 86, No. 4, pp. 57-61, ISSN: 0194-5947, 4pp.

Rubel, Chad, "Young firm armed with technology fights an old giant; ETM to Ticketmaster: Let's rock", American Marketing Association, Marketing News TM, Jun. 19, 1995, 3pp.

"Tecmark Reward Terminal", Tecmark Services, Inc., Copyright 1996, (http //www tecmarkinc com/terminal htm), 1 pg.

"Staples The Office Superstore to Participate in Visa 'Rewards for Your Home' Promotion; Savings will be offered to thousands of Visa Staples customers.", Business Wire, Mar. 25, 1996, p. 3251164, 2pp.

Retailers in small N.D. town join forces (Discount Points Corp launches Discount Points, a multi-retailer consumer discount program), Tire Business, Apr. 29, 1996, vol. 14, No. 2, p. 10, 3pp.

Wagner, Jim, "Cameras Tell Mall What Door You Use, How Often You Go", Albuquerque Tribune, Aug. 9, 1996, Section: Evening, 2pp.

"Click this box for extra pepperoni; CyberSlice routes online orders", The Dallas Morning News, Dec. 2, 1996, Section: Business, 2pp.

"Frequent shopper programs are taking off.", Grocery Marketing, Jan. 1997, vol. 63, No. 1, p. 54, 2pp.

"Grocery shopping goes on line in many markets; Technology spurs remote ordering concept", The Dallas Morning News, May 12, 1997, Section: Business at p. 2D, 2pp.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.

Quinn, Jane Bryant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43, ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

Davis, Tim "Vending suppliers scurry to meet Coke-Mandated vendor communication", Automatic Merchandiser, Dec. 1992, pp. 62-64, 2pp.

Del Rosso, Laura, "Firm proposes ticket-bidding system; Marketel explores electronic auction of travel; Marketel International", Travel Weekly, Nov. 13, 1989, Section: No. 91, vol. 48, p. 1, ISSN: 0041-2082, 3pp.

"Cash Machines Offer a Whole Lotto Money for Withdrawal" Crain's Chicago Business, Jun. 19, 1995, Sec. News, p. 8.

Kelsy, John and Schneier, Bruce, "Conditional Purchase Orders", Fourth AMC Conference on Computer Communications Security, ACM Press, Apr. 1997, 8pp.

Prochaska-Cue, Kathy, "Acquiring Credit", (http//ianrwww.unl.edu/IANR/PUBS/NEDFACTS/NF91-2.htm), download date: Sep. 3, 1997, 4pp.

Website: "Welcome to Onsale", (http.www.onsal.com) download date: Sep. 9, 1997, 15pp.

* cited by examiner

| DISPENSER IDENTIFIER 510 | PRODUCT IDENTIFIER 512 | STOCKED QUANTITY 514 | AVAILABLE QUANTITY 516 | CURRENT PRICE 518 |
|---|---|---|---|---|
| A1 | CHIPS | 10 | 2 | 0.75 |
| A2 | PRETZELS | 10 | 2 | 0.70 |
| A3 | GRANOLA | 15 | 12 | 0.50 |
| B1 | SANDWICH | 8 | 6 | 1.75 |
| B2 | APPLE PIE | 8 | 6 | 1.30 |
| B3 | FRUIT PIE | 8 | 7 | 0.90 |
| C1 | ORANGE DRINK | 8 | 8 | 0.45 |
| C2 | COLA | 8 | 3 | 1.05 |
| C3 | SPARKLING WATER | 15 | 5 | 0.75 |
| D1 | CANDY BAR | 15 | 2 | 0.80 |
| D2 | SPEARMINT GUM | 15 | 11 | 0.40 |
| D3 | POUND CAKE | 8 | 7 | 0.70 |

METHOD AND APPARATUS FOR DYNAMICALLY MANAGING VENDING MACHINE INVENTORY PRICES

BACKGROUND OF THE INVENTION

1. Field of the Invention

The present invention relates generally to vending machines. More particularly, the present invention relates to a method and apparatus for dynamically managing inventory pricing of a vending machine.

2. Description of the Related Art

Vending machines are well known and have existed since the late 1880s. The first vending machines were rudimentary devices primarily designed to dispense cigarettes and postcards. Modern vending machines are employed to store and dispense a vast array of merchandise in response to a customer request and appropriate payment. Such merchandise includes drinks, candy, frozen deserts, snacks, video tapes and children's toys.

Many entrepreneurs are attracted to the basic concept of selling products using a vending machine. Vending machines are generally considered to have significant advantages over traditional merchandising. Specifically, vending machines enable the automated sale of merchandise at unconventional locations and times; and they do not require sales personnel.

Although the basic advantages of vending machines are significant, prior art vending machines have several significant disadvantages when compared to traditional merchandising, particularly relating to inventory control and pricing. A first disadvantage is the difficulty of maintaining an inventory of perishable items. A second disadvantage is the difficulty of selling or "turning over" an inventory of low demand items or items of inferior quality. Although some vending machine suppliers offer to buy back inventory from operators who no longer want to sell certain products, such suppliers often fail to live up to their offer when an operator tries to exercise this option.

There have been many attempts at addressing the inventory problems of vending machines, including methods for determining what products are the best sellers, what are the appropriate times to re-stock vending machine items and in what quantities. The solutions include methods and systems that enable vending machine operators to remotely monitor inventory and remotely retrieve sales data. Other solutions have been proposed in the forms of accounting software and bar code readers that detect the expiration dates of vending machine items.

Examples of vending machine patent prior art include the following U.S. patents: U.S. Pat. No. 4,412,292, entitled "System for the Remote Monitoring of Vending Machines;" U.S. Pat. No. 4,654,800, entitled "Control and Monitoring Apparatus for Vending Machines;" U.S. Pat. No. 5,091,713, entitled "Inventory, Cash, Security, and Maintenance Control Apparatus and Method for a Plurality of Remote Vending Machines;" U.S. Pat. No. 5,367,452, entitled "Mobile Merchandising Business Management System which Provides Comprehensive Support Services for Transportable Business Operations;" and U.S. Pat. No. 4,282,575, entitled "Control and Monitoring Apparatus for Vending Machines." These inventions generally disclose remote monitoring systems, currency control systems, and data collection systems designed to address shortcomings of prior art vending devices.

Non-patent prior art includes VendMaster's software product entitled "Windows for Vending PRO with Inventory." This product enables a vending machine operator to report and analyze various historical sales data. VendMaster's product is intended to enhance a vending machine operator's ability to identify high-demand inventory, determine preferable times to stock the machine and calculate suggested prices.

The aforementioned solutions generally attempt to solve inventory problems by allowing operators to monitor and analyze raw sales data. These solutions fail to adequately address the aforementioned shortcomings of present vending machines. Specifically, the prior art fails to provide adequate solutions to the problems of maintaining an inventory of perishable items; increasing inventory turnover; and recovering the investment in low demand or inferior quality items.

Using the prior art solutions, an operator may use collected supply and demand data to help make pricing decisions, but the fact that operators must manually ratify and implement the decisions renders these solutions burdensome, inaccurate an inefficient. These solutions are burdensome in that the accounting and analysis required to arrive at pricing decisions is time consuming. These solutions are inaccurate as the human decision making process regarding pricing is largely arbitrary. These solutions are inefficient because human decisions and the implementations of those decisions are not dynamically responsive to real-time market pressures; they are delayed until the operator analyzes supply and demand data, arrives at a pricing decision, and posts the pricing decision.

Accordingly, the current methods of implementing new pricing decisions are inconsistent with the fundamental business philosophy of vending machines. Vending entrepreneurs have always adhered to the idea that vending machines manage themselves. Pricing decisions in a vending operation, however, cannot currently be implemented as easily as they may be, for example, in the retail environment where humans are physically present to monitor supply and demand and adjust prices accordingly.

A need therefore exists for a method and apparatus that monitors supply and demand of a vending machine inventory and that dynamically and automatically calculates and implements item prices to increase a vending machine's profitability. A need further exists for a method and apparatus for adjusting item prices of a vending machine to relieve vending machine operators of the burdens, inaccuracies and inefficiencies in management that result from the current methods of pricing items.

Accordingly, the shortcomings associated with the related art have heretofore not been adequately addressed. The present invention addresses such problems by providing an apparatus and processing approach that have not previously been proposed.

SUMMARY OF THE INVENTION

The present invention provides a method and apparatus to automatically and dynamically determine, adjust and manage product pricing in a vending machine to account for current market trends. According to a first aspect of the present invention, a method is disclosed for automatically managing a price of a product in a vending machine. The method includes the step of receiving a product identifier specifying the product. The method further includes the step of receiving inventory data. The inventory data includes the quantity of the product in the vending machine.

Next, the method includes the step of determining price management data associated with said product. The price management data specifies supply and demand data associated with the product. The method continues with the step of determining the price for the product, and storing the price management data and the price. This first method of managing inventory pricing is particularly useful if performed upon stocking the vending machine. An apparatus is also disclosed for performing the steps of first method.

According to another aspect of the present invention, a second method is disclosed for automatically managing a price of a product in a vending machine. The second method includes the step of accessing price management data and inventory data associated with the product. The inventory data and price management data are used, in part, to form the basis for the price in the step of determining the price of the product.

The determined price is then stored in a memory and preferably displayed. This second method may be performed in response to a particular event, such as a product sale, a change in the environment, or according to a schedule. An apparatus is also disclosed for performing the steps of the second method.

It is an object of the present invention to provide a method and apparatus for dynamically managing the price of a product in a vending machine. The above object and other objects features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIGS. 5A-5C are a table illustrating the structure of an price management table stored in the memory of the vending machine of FIG. 2;

DETAILED DESCRIPTION

Apparatus Architecture

Figure 1:
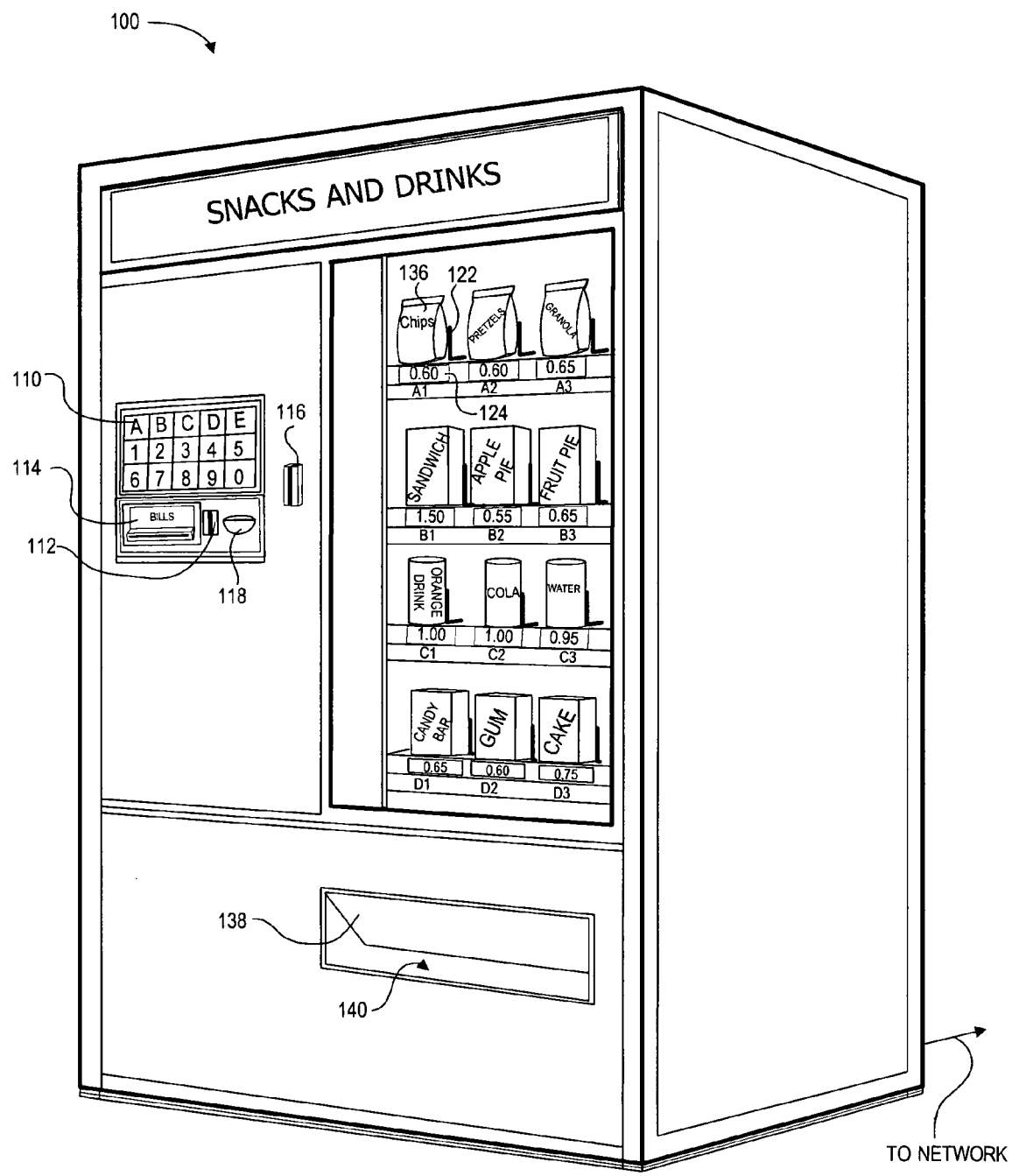
FIG. 1 is a perspective view of a vending machine according to one embodiment of the present invention.
Figure 2:
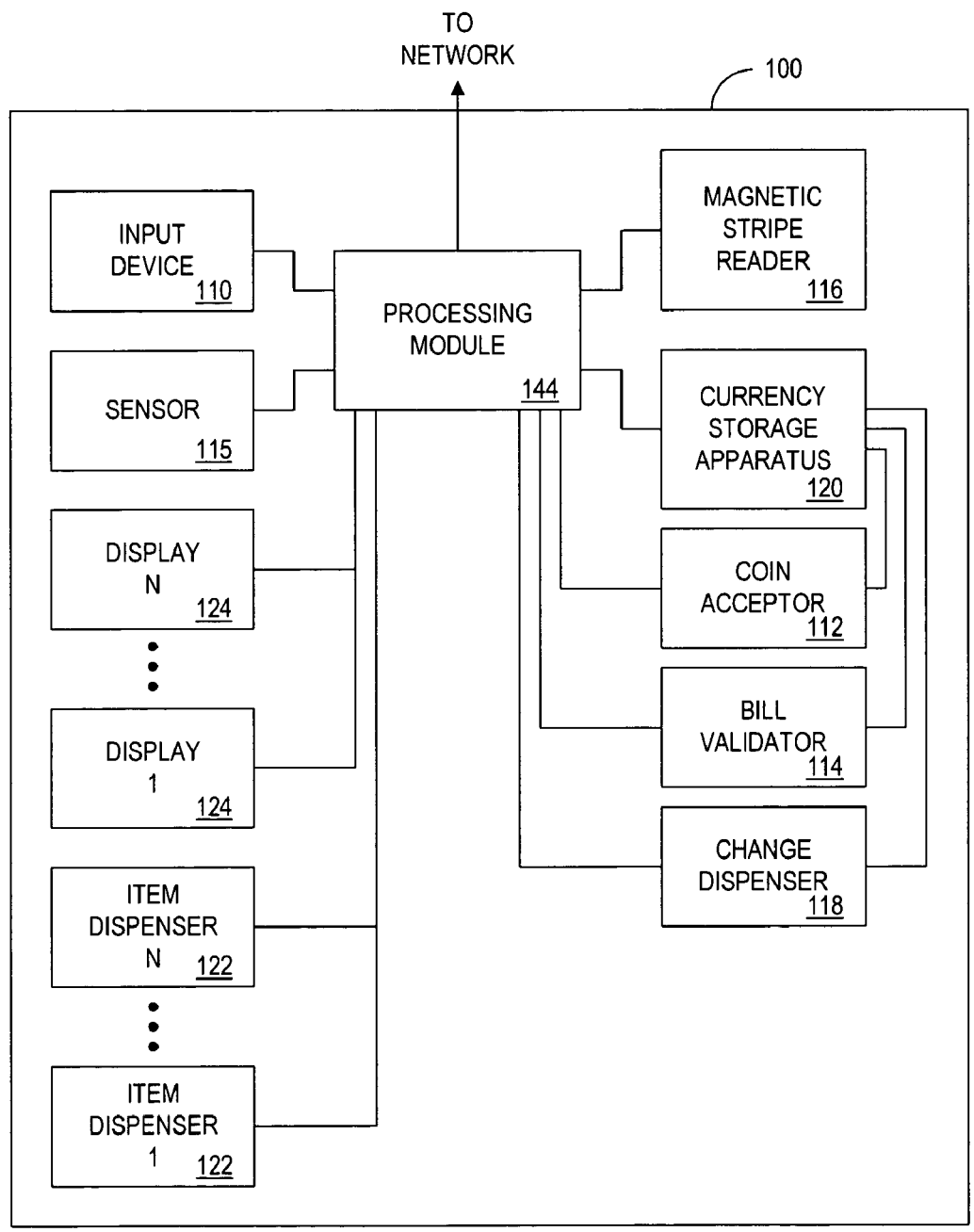
FIG. 2 is a schematic block diagram illustrating the components of the vending machine according to one embodiment of the present invention.
Figure 3:
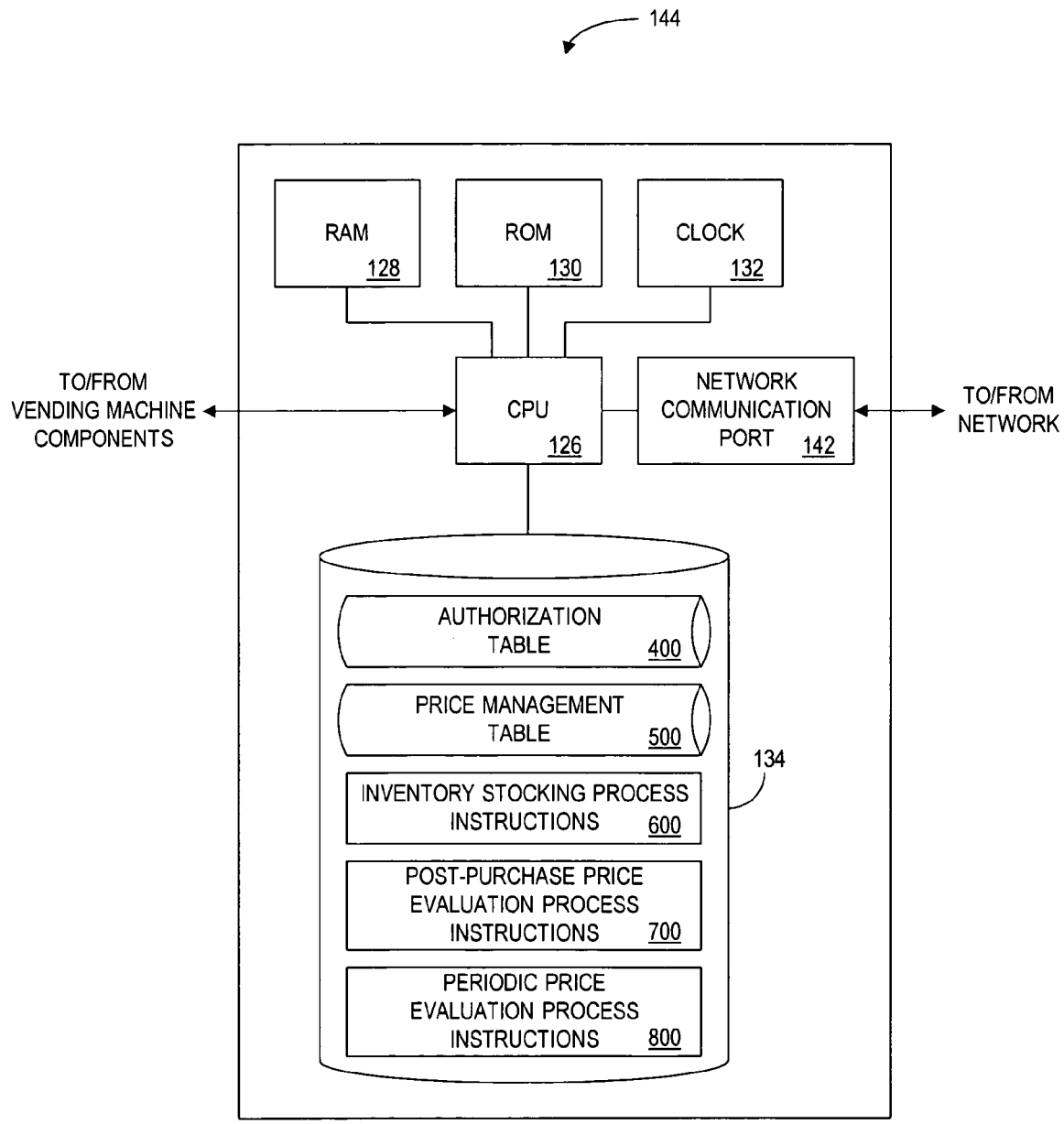
FIG. 3 is a schematic block diagram illustrating the components of the processing module of the vending machine of FIG. 2.

An embodiment of the method and system of the present invention will now be discussed with reference to FIGS. 1-8B. FIGS. 1-3 illustrate the components of one exemplary vending machine 100 including the features of the present invention. Although specific exemplary vending machine 100 is referred to throughout the detailed description, the present invention is directed to any automatic sales machine that allows payment to be exchanged for goods. Payment can be presented through a variety of media including, but not limited to, coins, bills and other currencies, magnetic stripe cards and smart cards (whether pre-paid or linked to an account), and identification codes. FIG. 1 is a perspective view of vending machine 100; FIG. 2 is a schematic block diagram of vending machine 100; and FIG. 3 is a schematic block diagram of the processing module of vending machine 100.

As shown, vending machine 100 includes an input device 110 for receiving input from a customer indicating a product selection. Input device 110 may also be used for receiving input from an operator during stocking or maintenance of vending machine 100. Although input device 110, as illustrated, includes a set of alpha-numeric keys for providing input to vending machine 100, input device could include a selector dial, a set of buttons associated with a respective set of item dispensers, or any other conventional input device commonly employed by a vending machine designer. Further, vending machine 100 may include more than one input device 110. For example, vending machine 100 may include an exterior input device 110 for receiving customer input and an interior input device (not shown) for receiving operator input. In the illustrated embodiment, input device 110 receives input data from both operators and customers.

As shown, vending machine 100 includes a sensor 115 for sensing surrounding environmental conditions. Sensor 115 is preferably a conventional temperature sensor configured to sense the local outdoor temperature or the external environmental temperature surrounding vending machine 100. Sensor 115 could include a receiver for receiving a local temperature from a weather service.

Vending machine 100 also includes several mechanisms for receiving payment and dispensing change, including coin acceptor 112, bill validator 114, magnetic stripe reader 116 and change dispenser 118. Magnetic stripe reader 116 is a conventional reader for reading data on the magnetic stripe of a credit or debit card, and it may cooperate with conventional remote point-of-sale credit card processing equipment (not shown) to validate credit based purchases through a conventional credit authorization network. Coin acceptor 112, bill validator 114 and change dispenser 118 communicate with currency storage apparatus 120 and may include conventional devices such as Mars models AE-2400, MC5000, TRC200 or CoinCo model 9300-L. Coin acceptor 112 and bill validator 114 receive and validate currency that is stored by currency storage apparatus 120.

Referring now to FIGS. 2 and 3, coin acceptor 112, bill validator 114, magnetic stripe reader 116 and change dispenser 118 communicate with, and are controlled by, processing module 144. Processing module 144 includes network communication port 142 for communicating with the previously mentioned components of vending machine 100 and for communicating with a central controller via a network (not shown).

In addition to the elements previously mentioned, processing module 144 includes a central processing unit 126 ("CPU") connected to communication port 142. CPU 126 communicates with random access memory (RAM) 128, read only memory (ROM) 130, clock 132. CPU 126 also communicates with at least one item dispenser 122, at least one price display 124 and storage device 134. Price display 124 may be any display device, preferably a digital display, employing conventional technology such as a light emitting diode ("LED") display or a liquid crystal display ("LCD").

Vending machine 100 includes twelve item dispensers 122 and twelve price displays 124, one item dispenser and display corresponding to each product offered for sale by vending machine 100. As in many conventional vending machines, item dispenser 122 may be activated by CPU 126 after a customer has purchased item 136, causing item 136 to be transferred to receptacle 140. A customer has access to a purchased item in receptacle 140 via door 138. Purchased item 136 can then be removed by a customer from receptacle 140 through door 138.

As shown in FIGS. 1 and 2, each item dispenser 122 has a corresponding price display 124 that displays information pertaining to item 136 dispensed by item dispenser 122. Typically, price display 124 will display the price of item 136 as determined according to the steps of the present invention. Although vending machine 100, as illustrated, includes a plurality of item dispensers 122 and a plurality displays 124, this is only one possible embodiment of the many types of vending machines that could employ the present invention. Selecting an appropriate conventional item dispensing mechanism, a single item dispenser 122 could be used to dispense the plurality of items 136. Likewise, a single price display 124 could be used to communicate prices and other information of the plurality of products.

As shown in FIG. 3, storage device 134 stores a database of authorization and price management data, including an authorization table 400; and a price management table 500. Tables 400 and 500 comprise at least a portion of the data stored by storage device 134 and are described more fully with reference to FIGS. 4 and 5, respectively. Storage device 134 further includes instructions for implementing the steps of the present invention. Specifically, storage device 134 includes inventory stocking process instructions 600; post-purchase price evaluation process instructions 700; and periodic price evaluation process instructions 800. Storage device 134 is preferably a magnetic disk drive, but could be a CD-ROM drive, optical disk drive, RAM drive or any other conventional storage device as would be deemed appropriate by one of ordinary skill in the art.

Data Tables

Figure 4:
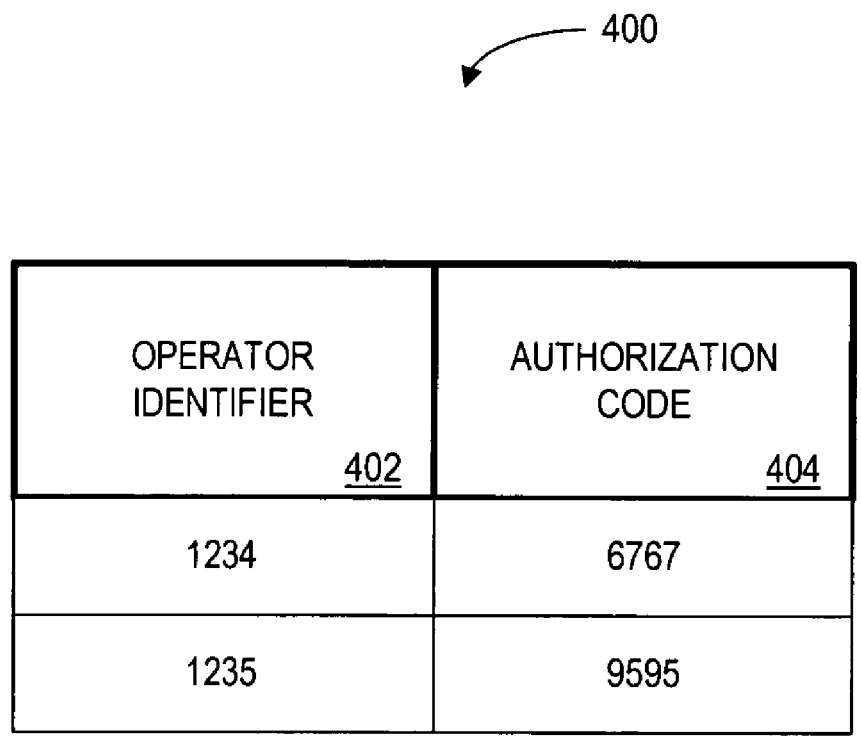
FIG. 4 is a table illustrating the structure of an authorization table stored in the memory of the vending machine of FIG. 2.

FIG. 4 illustrates the contents of an exemplary authorization table 400 in tabular format. Each record of authorization table 400 includes an operator identifier 402 and an authorization code 404 that defines a valid operator identifier/authorization code pair. Authorization table 400 is utilized to enable only authorized operators to access the price management data stored in storage device 134. Of course, authentication table 400 could also be used for authentication of network control and monitoring signals in accordance with the network configuration more fully described with reference to FIG. 9.

Figure 5B:
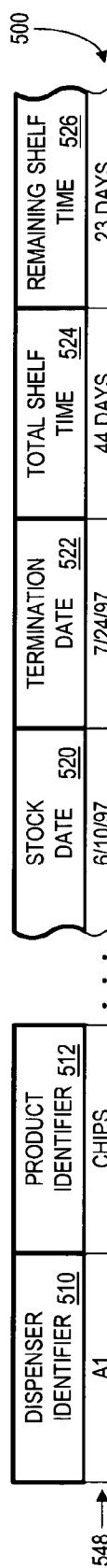
Figure 5C:

FIGS. 5A, 5B and 5C illustrate the contents of an exemplary price management table 500. Each of the twelve illustrative records 548-570 of price management table 500 represents information pertaining to a specific product and item dispenser. For purposes of illustration, this data is based on a system date of Jul. 1, 1997. Generally, the data stored in price management table 500 falls into three categories: inventory data, shown in FIG. 5A; evaluation data, shown in FIG. 5B; and pricing data, shown in FIG. 5C. Certain data elements may fall into more than one category, as described below.

Each record in price management table 500 includes a dispenser identifier 510 and a product identifier 512. Dispenser identifier field 510 stores a dispenser identifier that uniquely identifies a corresponding item dispenser 122 of vending machine 100. Product identifier field 512 identifies the product associated with the dispenser identified by field 510.

In the present embodiment, there is a one to one correspondence between a dispenser and a product, i.e. either field uniquely identifies a record. In other words, each dispenser dispenses only one product, and each product is limited to a single dispenser. One of ordinary skill will recognize that by distributing the price management data among multiple tables, multiple products could be offered in a single dispenser, and/or multiple dispensers could dispense the same product.

The remaining fields shown in FIG. 5A store data generally describing the inventory of vending machine 100. Stocked quantity field 514 stores the number of items that were originally stocked in the dispenser identified by field 510. The contents of this field are input by an operator during stocking or routine maintenance. Available quantity field 516 contains the number of items currently associated with the dispenser identified by field 510. After stocking or routine maintenance, the contents of field 516 is automatically set equal to the contents of field 514, for each record corresponding to a restocked product. Thereafter, the available quantity is automatically updated by CPU 126 for each associated item sold.

Current price field 518 contains the selling price of the product associated with the item dispenser. Current price field 518 may be populated by the operator during stocking or routine maintenance, and may be determined according to the process steps of the present invention. Exemplary process steps which may be executed to automatically determine a current price are described with reference to FIGS. 6-8B.

FIG. 5B illustrates fields of price management table 500 that define when a price is dynamically evaluated. Stock date field 520 stores the date the dispenser identified by field 510 was most recently stocked. Termination date field 522 contains the last date on which the items of the associated dispenser may be sold. The termination date is entered by an operator during stocking of vending machine 100 and may be a date entered by the operator, the expiration date of the items in the associated dispenser, or another relevant date, such as the next scheduled stocking date.

The next two fields of price management table 500 define shelf times for the product identified by field 512. Total shelf time field 524 defines the maximum allowable shelf time for the product. The contents of field 524 are calculated by CPU 126 based on stock date field 520 and termination date field 522 upon stocking. Remaining shelf time field 526 defines the remaining shelf time of the product and is periodically calculated by CPU 126 based on the system date, and the contents of field 522.

Evaluation frequency field 528 stores a code representing a rule defining the frequency with which the CPU 126 should evaluate the price of the product identified by field 512. Although field 528 only contains a code, the contents of field 528 illustrated in FIG. 5 show the logical representations of the codes. The evaluation rule applicable to a product is generally selected by an operator from a set of rules defined by the vending machine manufacturer. In the examples shown in FIG. 5, evaluation frequency field 528 may store a code representing a rule to evaluate a product price every x purchases or a rule to evaluate a product price every y hours, where x and y are greater than zero.

Of course, the present invention envisions numerous alternative evaluation frequency rules. For example, a rule could be defined to evaluate the price whenever sensor 115 senses a predetermined condition. If sensor 115 is a thermostat, CPU 126 could be programmed to evaluate the price whenever the temperature exceeded a predefined temperature. Other evaluation frequency rules could be implemented to evaluate the price when demand for a product rapidly changes or if at the current demand level items will remain stocked past the termination date in field 522. Further, CPU 126 could be programmed to evaluate prices during periods of low activity, such as during the early morning.

Last evaluation date/time field 530 stores a timestamp identifying the time of last sale, and field 532 stores the number of sales of the associated product made since the last price evaluation. These fields are periodically updated by CPU 126, and are periodically accessed by CPU 126 based on the evaluation rule represented by the contents of field 528.

Fields 534-538 define demand-based price evaluation parameters. Previous demand field 534 stores the level of demand as of the last price evaluation. Current demand field stores the current demand level for the product in the dispenser identified by the contents of field 510. CPU 126 periodically calculates the current demand and stores it in field 536. After each evaluation, CPU 126 sets the contents of previous demand field 534 equal to the contents of current demand field 536. Demand increment field 538 defines the incremental difference between the previous demand and the current demand that is required to trigger a price evaluation process.

FIG. 5C illustrates fields of price management table 500 that are used to calculate the current price stored in field 518. Price adjustment increment field 540 stores the amount by which the price of the product identified by field 512 may be adjusted. Of course, the price of the product identified by field 512 may be adjusted by multiples of the price adjustment increment.

Fields 542-546 define price parameters for the product identified by field 512. The minimum price to be charged for the product is stored in minimum price field 542; the manufacturer's suggested retail price for the product is stored in suggested price field 544; and the maximum price to be charged for the product is stored in maximum price field 546.

The manufacturer's suggested retail price of field 544 may be used as the initial current price after stocking, or it may be used as a factor to determine future prices. The minimum price and maximum price fields 542 and 546 are used to prevent the calculated price from falling outside a predetermined range. This financially protects both the vending machine operator and the consumer.

Evaluation Process Steps

Having thus described the system architecture and components of the present embodiment, the operation of the system will now be described in greater detail with reference to FIGS. 6A-8B, and continuing reference to FIGS. 1-5C. It is to be understood that the software instructions necessary to provide the functionality described herein are preferably stored in storage device 134 of vending machine 100, but may be stored in ROM 130.

According to the present invention, there are generally three times at which it is appropriate to determine the price of a product in a vending machine: after stocking, after a sale of an item and after a period of time. FIGS. 6A-6B, FIGS. 7A-7B and FIGS. 8A-8B illustrate the process steps executed by vending machine 100 to determine a price of a product at each of these times, respectively.

Figure 6A:
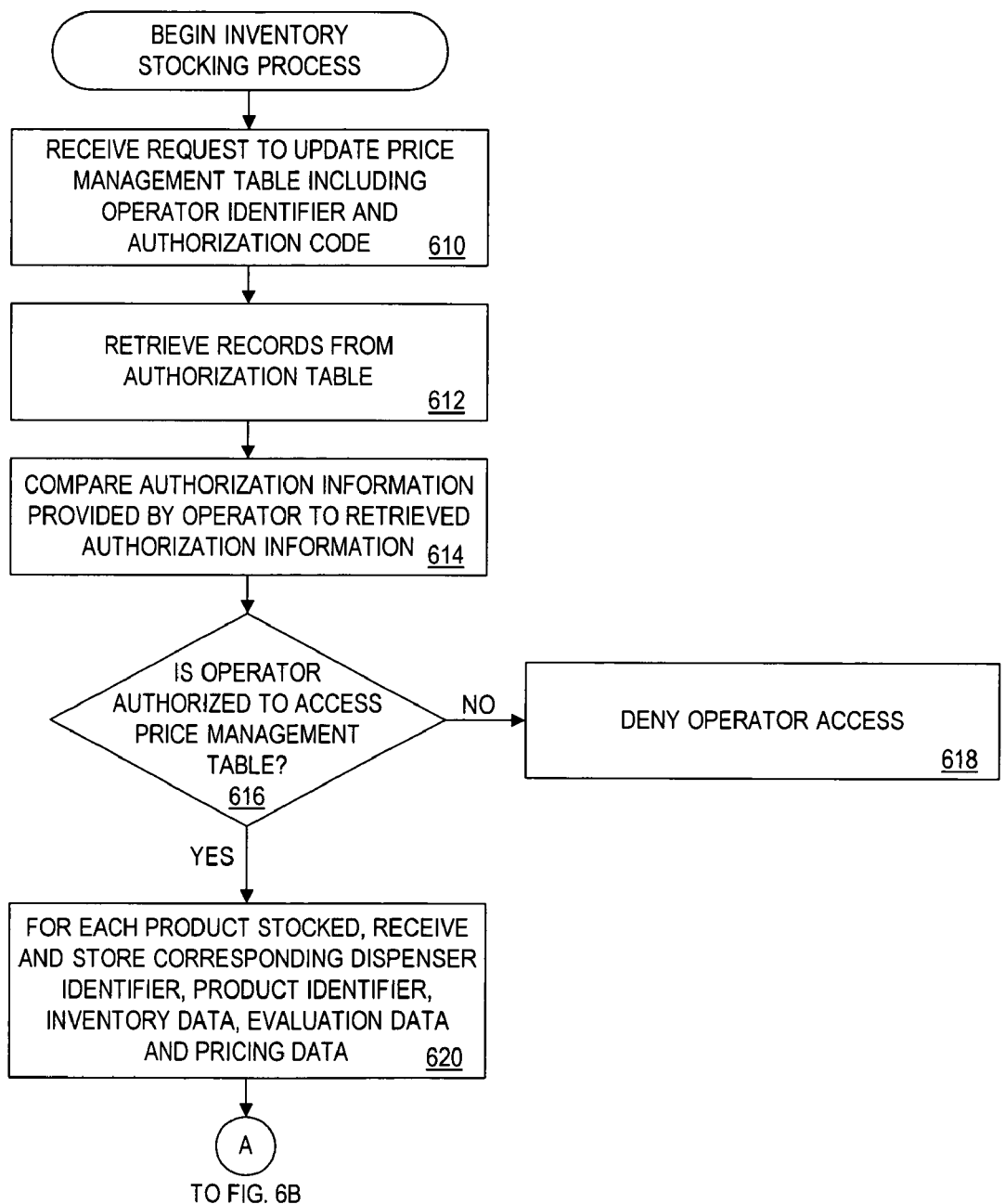
FIGS. 6A-6B is a flow chart illustrating the computer implemented steps used to set a product price upon stocking the vending machine of FIG. 2.
Figure 6B:
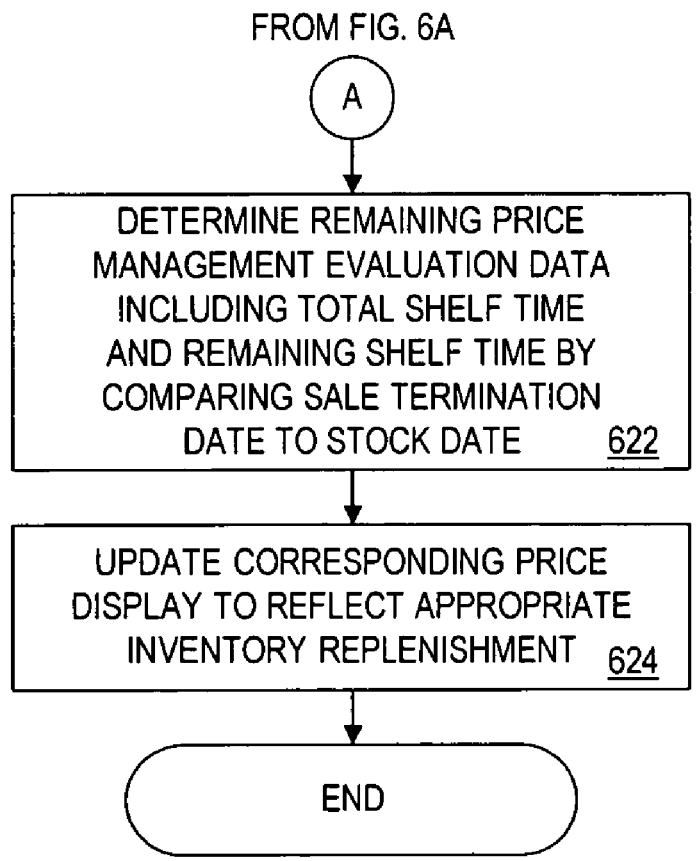

Referring now to FIGS. 6A and 6B, the process steps executed by vending machine 100 to determine a price of a product after stocking will be described. As shown at step 610, CPU 126 receives a request to update price management table 500. This request indicates that an operator is stocking vending machine 100, and the request includes an operator identifier and authorization code entered by the operator.

At step 612, CPU 126 retrieves a record from authorization table 400 using the received operator identifier as an index. CPU 126 then, as shown at step 614, compares operator identifier and authorization code received at step 610 with the contents of operator identifier field 402 and authorization code field 404 retrieved at step 612, respectively. If the comparison yields a match of the respective data, CPU 126 proceeds to execute step 620, otherwise, CPU 126 denies the operator access to price management table 500.

At step 620, CPU 126 receives input from the operator. The operator inputs a dispenser identifier, a product identifier and relevant portions of the inventory, evaluation and pricing data pertaining to the stocked product and associated dispenser to be stored in price management table 500. The inventory data received from the operator includes a stocked quantity, and a current price. The evaluation data received from the operator includes a termination date, an evaluation frequency and a demand increment. The pricing data received from the operator includes a price adjustment increment, a minimum price, a suggested price and a maximum price. The data received from the operator is stored by CPU 126 in the appropriate fields of price management table 500. Of course, receiving data for one or more of these fields from the operator may be optional as CPU 126 could supply default values for certain fields. In addition, the data for one or more of these fields could be automatically received from a remote source using the network configuration illustrated in FIG. 9 or from an attached bar code reader (not shown) such as the U.P.C. scanners attached to the vending machines manufactured by Automatic Vending America, Inc.

At step 622, CPU 126 calculates the remaining price management data to be stored in price management inventory table 500. Specifically, CPU 126 calculates the total shelf time, remaining shelf time and current price for the associated product. Although, the current price may be input by the operator, the current price would preferably be set equal to the manufacturer's suggested price stored in field 544. Of course, in an alternate embodiment, the current price could be determined in accordance with the price evaluations described below with reference to the post-purchase evaluation process and the periodic evaluation process.

At step 624, the stocking process concludes with the step of adjusting the price display 124 corresponding to item dispensers 122 dispensing the associated product. The price displays 124 are adjusted to display the price determined at step 620.

Figure 7A:
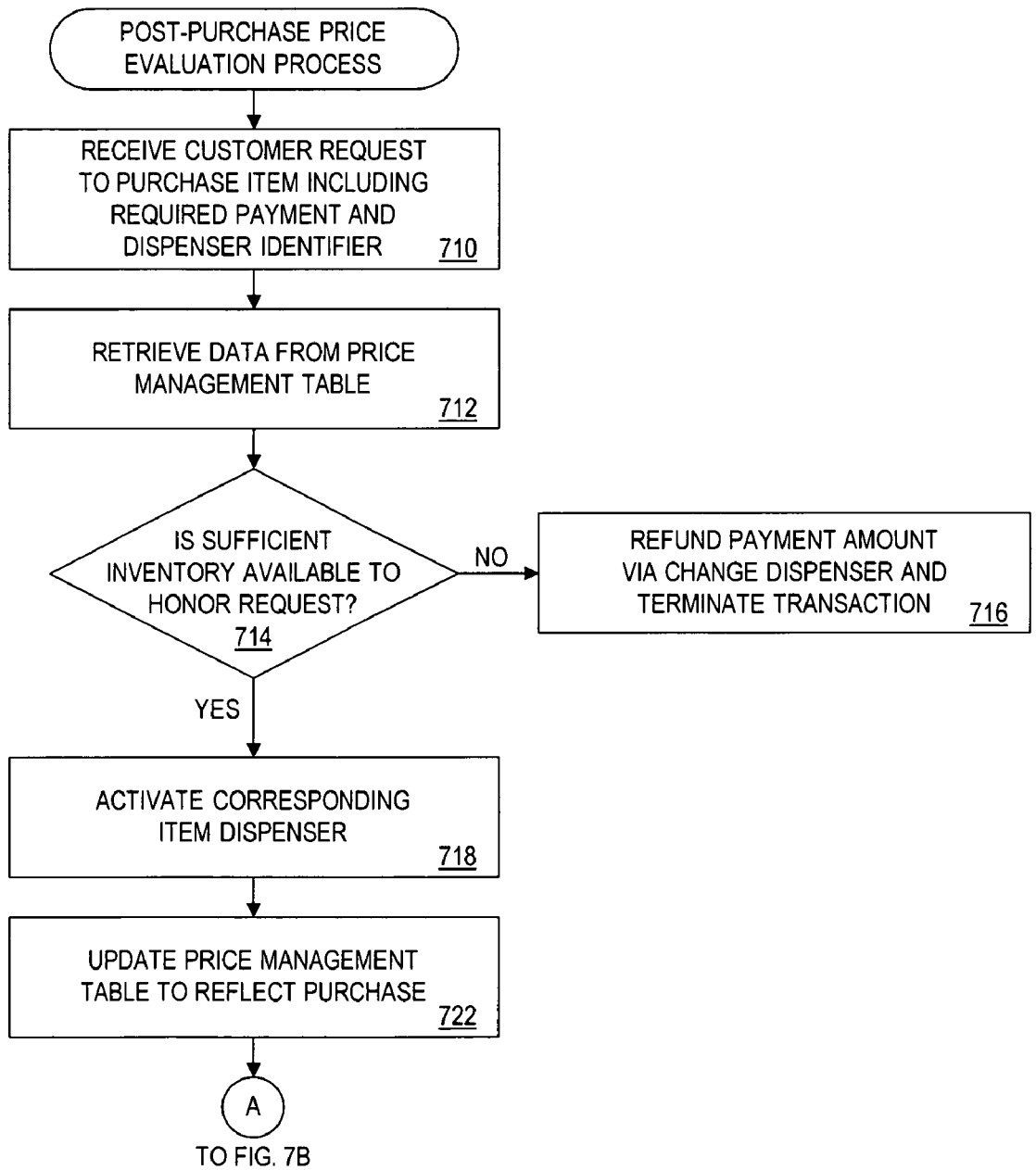
FIGS. 7A-7C is a flow chart illustrating the computer implemented steps used to set a product price after a product purchase at the vending machine of FIG. 2.
Figure 7B:
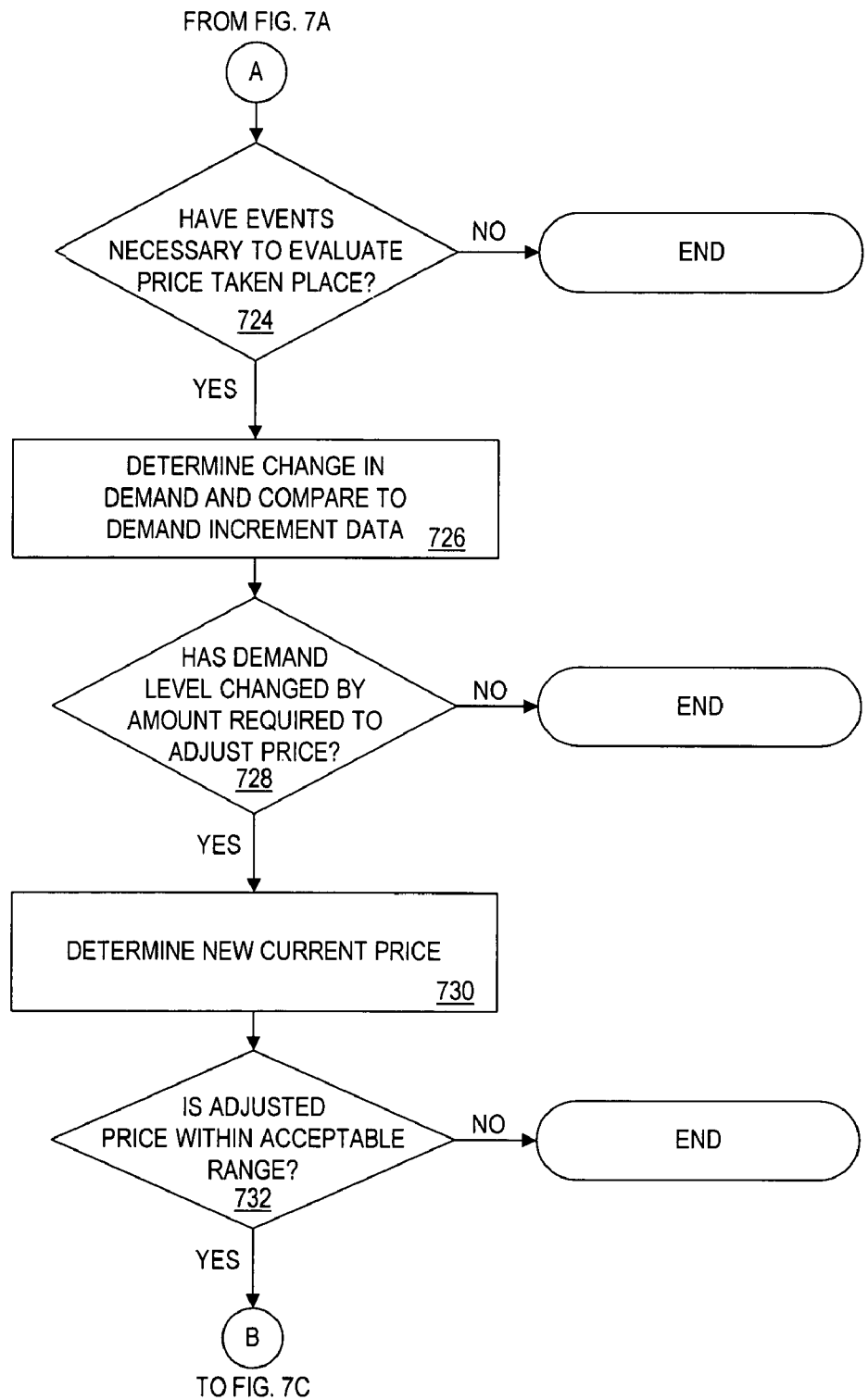
Figure 7C:
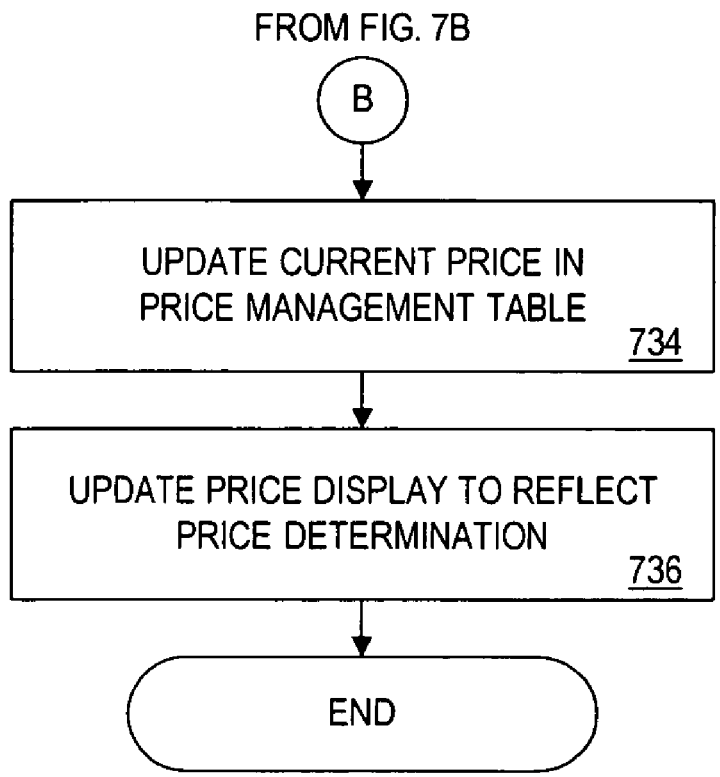

Referring now to FIGS. 7A, 7B and 7C, the process steps executed by vending machine 100 to determine a price of a product after a sale of an item will be described. At step 710, CPU 126 receives a customer request to purchase an item. In accordance with vending machine 100, the request includes an indication of payment and a dispenser identifier. In other embodiments, the request may include a product identifier instead of the dispenser identifier. CPU 126 then uses the received dispenser identifier to retrieve the relevant record from price management table 500, as shown at step 712. Based on the contents of field 516, a determination is made at step 714 whether sufficient inventory is available to honor the request. If there is not sufficient inventory, CPU 126 processes step 716 and causes change dispenser 118 to return any inserted payment, and the transaction is terminated. If vending machine 100 holds sufficient inventory to honor the request, CPU 126 processes step 718 and activates item dispenser 122 corresponding to the dispenser identifier received at step 710.

At step 722, CPU 126 updates the price management data pertaining to the product selected by the customer and stores the updated data in price management table 500. The step of updating includes the step of decrementing the contents of available quantity field 516, incrementing the contents of field 532 to reflect the sale and updating the contents of current demand field 536. At step 724, a determination is made whether the necessary events have occurred to require a price evaluation for the selected product. In the present embodiment, this step includes comparing the parameter identified by evaluation frequency field 528 to either last evaluation date/time field 530 or sales since last evaluation field 532. If it is time to evaluate the price of the selected product, CPU processes step 726.

At step 726, CPU 126 calculates the change in demand for the specified product and at step 728 compares the calculated change in demand to the demand increment data stored in field 538. If the demand for the specified product has changed by at least the demand increment stored in field 538, CPU 126 processes step 730 and determines a new current price for the specified product. One preferred formula that can be used to determine a new current price is:

$$P_{nc} = P_{current} \pm P_{increment}$$

where:

$P_{nc}$ represents the new current price;
$P_{current}$ represents the current price stored in field 518; and
$P_{increment}$ represents the price increment stored in field 540.

If the demand for the product has increased, the new current price equals the contents of current price field 518 plus the contents of price adjustment field 540. If the demand for the product has decreased, the new current price equals the contents of current price field 518 less the contents of price adjustment field 540. At step 732, CPU 126 verifies that the new current price falls within the range of acceptable prices as defined by minimum price field 542 and maximum price field 546.

If the new current price is within the acceptable range, current price field 518 is updated to reflect the new current price as shown at step 734. It is important to note that although a specific price determination formula has been described herein, the method and apparatus of the present invention is intended to work with many different price determination formulas applicable to product pricing. Various formulas may easily be implemented by one of ordinary skill in the art with minor design variations. Finally, at step 736, CPU 126 updates the price display 124 associated with subject item dispenser to reflect the new current price of the product.

Figure 8A:
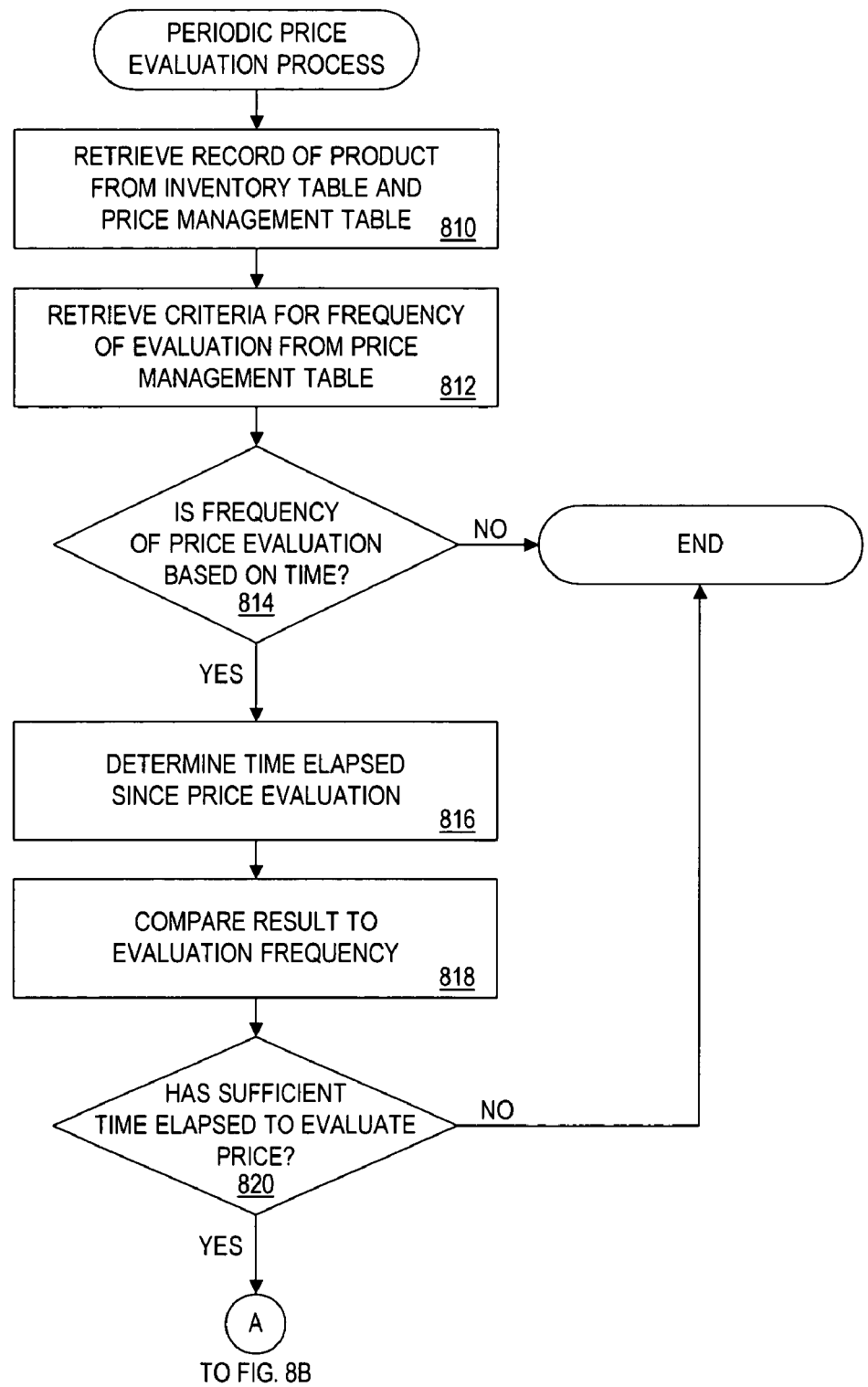
FIGS. 8A-8B is a flow chart illustrating the computer implemented steps used to set a product price at the vending machine of FIG. 2 according to a predetermined schedule.
Figure 8B:
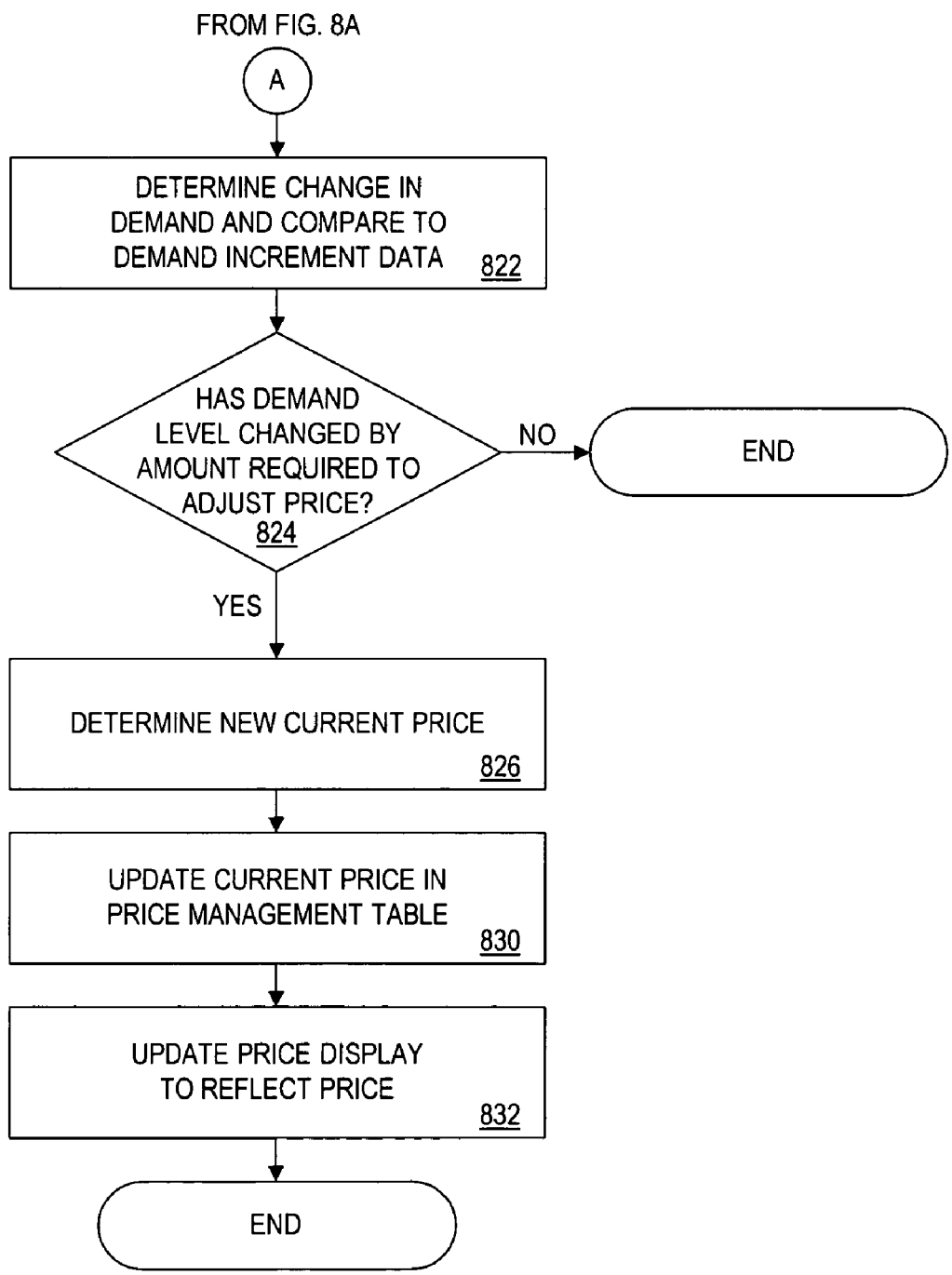

Referring now to FIGS. 8A and 8B, a flow chart is presented illustrating the exemplary process steps that may be executed to determine the price of a product during a periodic price evaluation. The process steps of FIGS. 8A and 8B are described herein with respect to a single product. It is envisioned that these steps will be repeated for each product represented in price management table 500.

At step 810, CPU 126 begins the periodic price evaluation process by retrieving a record associated with a specified product from price management table 500. At step 812, CPU 126 accesses the contents of evaluation frequency field 528 to determine if the price evaluation frequency is based on time, as shown at step 814. If the evaluation of the product's price is not based on time, the process ends. Otherwise, the process proceeds to step 816. In an alternate embodiment, step 814 may include determining whether the quantity of the product is non-zero. If the quantity of the product is zero, CPU 126 would terminate the process to avoid evaluating the price of an unavailable product.

At step 816, CPU 126 determines the time elapsed since the price of the product was last evaluated. This is accomplished by retrieving the system date and time from clock 132 and comparing the system date and time to the date and time stored in last evaluation date/time field 530. At step 818, the result is compared to the evaluation frequency parameter indicated by field 528. If sufficient time has elapsed, the process proceeds with step 822. Otherwise, the process ends.

At step 822, CPU 126 calculates the change in demand for the specified product and compares the calculated change in demand to the demand increment data stored in field 538. If the demand for the specified product has changed by at least the demand increment stored in field 538, CPU 126 processes step 826 and determines a new current price for the specified product. One possible formula that can be used to determine a new current price is:

$$P_{nc} = [(ST_{remain}/ST_{total}) \times (P_{maximum} - P_{minimum})] + P_{minimum}$$

where:

$P_{nc}$ represents the new current price;
$ST_{remain}$ represents the remaining shelf time stored in field 526;
$ST_{total}$ represents the total shelf time stored in field 524;
$P_{maximum}$ represents the minimum price stored in field 542; and
$P_{minimum}$ represents the maximum price stored in field 546.

This formula determines the new current price based on the remaining shelf life and the maximum and minimum price boundaries. In this embodiment, the calculated price may be rounded to the nearest price adjustment increment indicated in field 540. At step 830, current price field 518 is updated to reflect the new current price as shown at step 830. Finally, at step 832 CPU 126 updates the price display associated with subject item dispenser to reflect the new current price of the product.

Referring back to FIGS. 5A-5C, the contents of record 562 illustrates the result of process 800. As shown by field 512, record 550 is associated with a dispenser stocked with cola. According to field 526, the remaining shelf time for the cola in inventory is 62 days, while the total shelf time stored in field 524 is 70 days. The maximum price for cola, stored in field 546, is $1.15, and the minimum price is $0.35, as shown by field 542. To calculate the selling price of cola according to the present embodiment, CPU 126 applies the formula described above:

$$P_{nc} = [(ST_{remain}/ST_{total}) \times (P_{maximum} - P_{minimum})] + P_{minimum}$$

$$P_{nc} = [(62/70) \times (\$1.15 - \$0.35)] + \$0.35$$

$$P_{nc} = \$1.0586$$

Rounding the result to the nearest price adjustment increment stored in field 540, the selling price is $1.05.

As described, the price evaluation formulas discussed with reference to FIGS. 7A-7C and 8A-8B rely on data collected and stored in price management table 500. The present invention may employ other factors in place of or in addition to stored data to determine a current selling price. In particular, output from sensor 115 may be used to determine the price of a product. For example, in the case where sensor 115 is a thermometer, a price calculation could be employed that increases the price of a soft drink as the external temperature increases. Alternatively, the price of hot chocolate could increase as the external temperature decreases.

Figure 9:
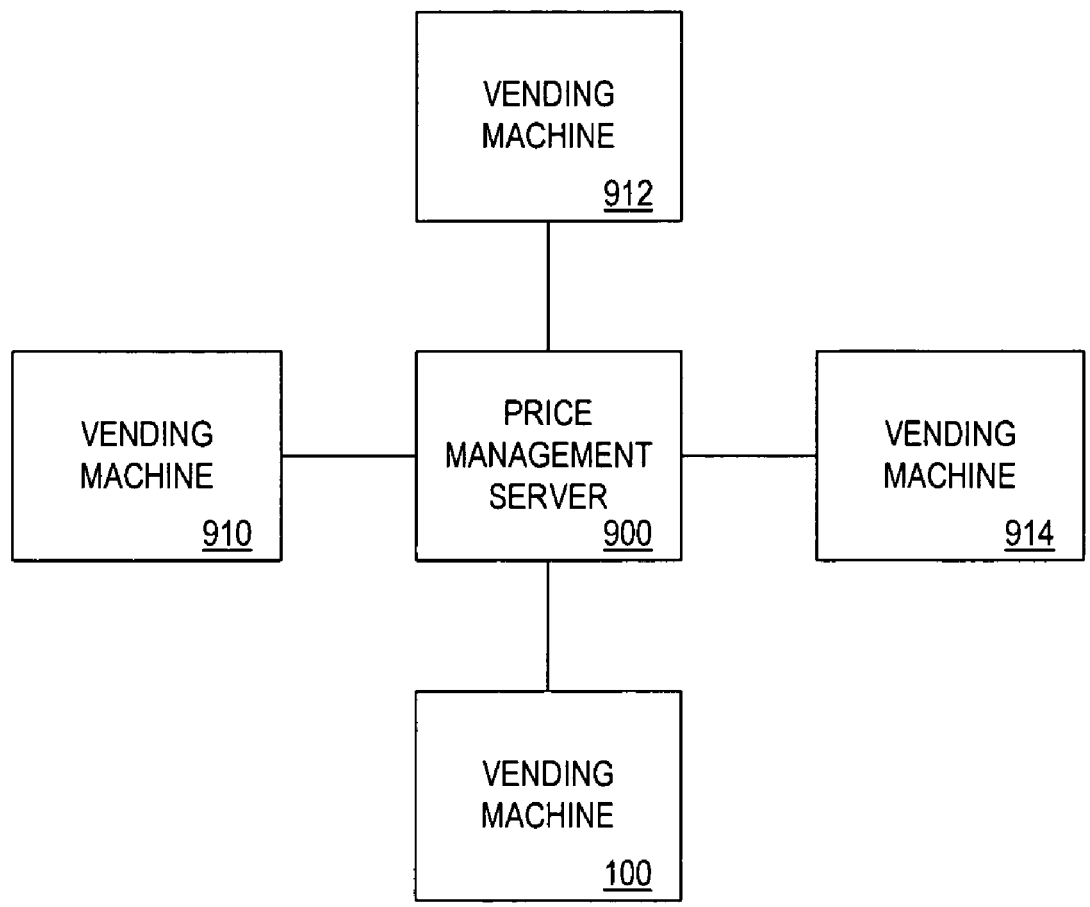
FIG. 9 is a schematic block diagram illustrating a network embodiment of the present invention.

Referring now to FIG. 9, a network is shown to illustrate an alternate embodiment of the present invention. Price management server 900 and a plurality of vending machines 100, 910, 912 and 914 (collectively, the "nodes") preferably transmit digitally encoded data and other information between one another. The communication links between the nodes and price management server 900 preferably comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave or satellite networks.

In this configuration, the previously described functionality provided by processing module 144 (i.e. inventory management and dynamic price adjustment) can be remotely performed by price management server 900. The resulting price adjustments are transmitted from price management server 900 to each of the plurality of vending machines.

Conventional cryptographic techniques may be employed to ensure the authenticity of remote data received by the nodes. Further, authentication table 400, or a functional equivalent, may be employed at price management server 900, the node or both.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A vending machine, comprising:
an inventory of products offered for sale via said vending machine, said inventory of products at least comprising a positive number of units of a first product of said inventory of products;
a memory configured to store, in association with said first product:
price management data comprising at least a minimum price, a maximum price, and a price adjustment increment;
inventory data indicative of said number of units of said first product; and
current price data for each unit of said number of units of said first product; and
a processor operatively coupled to said memory, said processor configured to:
determine, based on a time-related evaluation criteria, that a current price of each unit of said number of units of said first product should be evaluated;
access, based on a determination that said current price of each unit of said number of units of said first product should be evaluated, said price management data, said inventory data, and said current price data; and
determine said price of each unit of said number of units of said first product, said price being based on said price management data, said inventory data, a change in demand for said first product, and said current price data, and wherein said price is between said minimum price and said maximum price and is an even multiple of said price adjustment increment.

2. A vending machine, comprising:
an inventory of products offered for sale via said vending machine, said inventory of products at least comprising a positive number of units of a first product of said inventory of products;
a memory configured to store, in association with said first product:
price management data comprising at least a minimum price, a maximum price and a price adjustment increment;
inventory data indicative of said number of units of said first product; and
current price data for each unit of said number of units of said first product; and
a processor operatively coupled to said memory, said processor configured to:
determine, based on a time-related evaluation criteria, that a current price of each unit of said number of units of said first product should be evaluated, wherein said time-related evaluation criteria is based on a number hours that have elapsed since a purchase has been made via said vending machine;
access, based on a determination that said current price of each unit of said number of units of said first product should be evaluated, said price management data, said inventory data, and said current price data; and
determine said price of each unit of said number of units of said first product, said price being based on said price management data, said inventory data, and said current price data, and wherein said price is between said minimum price and said maximum price and is an even multiple of said price adjustment increment.

3. A vending machine, comprising:
an inventory of products offered for sale via said vending machine, said inventory of products at least comprising a positive number of units of a first product of said inventory of products;
a memory configured to store, in association with said first product:
time-related price evaluation data;
price management data comprising at least data identifying a minimum price and data identifying a price adjustment increment;
inventory data indicative of said number of units of said first product; and
current price data for each unit of said number of units of said first product; and
a processor operatively coupled to said memory, said processor configured to:
access said time-related price evaluation data;
compare said time-related price evaluation data to a predetermined threshold to determine whether to update a current price of each unit of said number of units of said first product;
access, based on a determination that said current price of each unit of said number of units of said first product should be updated, said price management data, said inventory data, and said current price data; and
determine said price of each unit of said number of units of said first product, said price being based on said price management data, said inventory data, a change in demand for said first product and said current price data, and wherein said price is greater than said minimum price and is an even multiple of said price adjustment increment.

4. A vending machine, comprising:

an inventory of products offered for sale via said vending machine, said inventory of products at least comprising a positive number of units of a first product of said inventory of products;

a memory configured to store, in association with said first product:

time-related price evaluation data;

price management data comprising at least data identifying a minimum price and data identifying a price adjustment increment;

inventory data indicative of said number of units of said first product; and current price data for each unit of said number of units of said first product; and a processor operatively coupled to said memory, said processor configured to:

access said time-related price evaluation data;

compare said time-related price evaluation data to a predetermined threshold to determine whether to update a current price of each unit of said number of units of said first product, wherein said time-related price evaluation data comprises data related to a number hours that have elapsed since a purchase has been made via said vending machine and wherein said predetermined threshold defines a threshold number of hours that have elapsed since said purchase has been made via said vending machine;

access, based on a determination that said current price of each unit of said number of units of said first product should be updated, said price management data, said inventory data, and said current price data; and determine said price of each unit of said number of units of said first product, said price being based on said price management data, said inventory data, and said current price data, and wherein said price is greater than said minimum price and is an even multiple of said price adjustment increment.

5. A method, comprising:

determining, by a processor, that a product price evaluation frequency for a product offered for sale via a vending machine is associated with a time parameter;

determining, by the processor, an elapsed time since a previous product price evaluation;

determining, by the processor, that the elapsed time since the previous product price evaluation is greater than or equal to the time parameter;

calculating, by the processor, and after the determination that the elapsed time since the previous product price evaluation is greater than or equal to the time parameter, an updated price for the product;

rounding, by the processor, the calculated price to a price evenly divisible by a pre-determined price increment;

verifying, by the processor, that the price is less than a pre-determined maximum price and greater than a pre-determined minimum price; and displaying the price via a display device of the vending machine.

* * * * *